(12) United States Patent
Oshima et al.

(10) Patent No.: US 9,371,675 B2
(45) Date of Patent: Jun. 21, 2016

(54) ROTARY DAMPER AND HINGE DEVICE WITH DAMPER

(75) Inventors: Kazuyoshi Oshima, Tokyo (JP); Ken Shinmura, Tokyo (JP); Hideki Ogasawara, Tokyo (JP)

(73) Assignee: SUGATSUNE KOGYO CO., LTD., Tokyo (JP)

( * ) Notice: Subject to any disclaimer, the term of this patent is extended or adjusted under 35 U.S.C. 154(b) by 0 days.

(21) Appl. No.: 14/241,458

(22) PCT Filed: Aug. 29, 2012

(86) PCT No.: PCT/JP2012/071799
§ 371 (c)(1),
(2), (4) Date: Feb. 27, 2014

(87) PCT Pub. No.: WO2013/031810
PCT Pub. Date: Mar. 7, 2013

(65) Prior Publication Data
US 2014/0201947 A1    Jul. 24, 2014

(30) Foreign Application Priority Data
Aug. 31, 2011  (JP) .................................. 2011-189120

(51) Int. Cl.
*E05D 11/00* (2006.01)
*E05D 7/086* (2006.01)
(Continued)

(52) U.S. Cl.
CPC ................ *E05D 11/00* (2013.01); *E05D 3/142* (2013.01); *E05D 7/086* (2013.01); *E05F 3/14* (2013.01);
(Continued)

(58) Field of Classification Search
CPC ... Y10T 16/54; Y10T 16/2771; Y10T 16/304; Y10T 16/5383; Y10T 16/53832; Y10T 16/53833; Y10T 16/61; Y10S 16/09; E05D 3/142; E05D 7/086; E05D 11/00; F16F 9/14; F16F 9/145; F16F 9/48; E05F 3/14; E05F 5/006; E05Y 2201/254; E05Y 2201/266; E05Y 2600/10; E05Y 2900/20; E05Y 2201/624; F16C 11/04
USPC ............ 16/319, 54, 50, 286–288, 82, DIG. 9; 188/290, 294, 322.5
See application file for complete search history.

(56) References Cited

U.S. PATENT DOCUMENTS 3,651,903 A * 3/1972 Butler et al. ................. 188/290
5,301,775 A   4/1994 Nedbal et al.
(Continued)

FOREIGN PATENT DOCUMENTS

EP    1388632 A2   2/2004
JP    64-736 U     1/1989
(Continued)

OTHER PUBLICATIONS

Extended European Search Report issued in European Application No. 12828072.4, mailed on Jun. 1, 2015 (7 pages).
(Continued)

*Primary Examiner* — William Miller
(74) *Attorney, Agent, or Firm* — Osha Liang LLP

(57) ABSTRACT

A rotary damper has a damper body having a receiving portion, and a rotor rotatably disposed in the receiving portion of the damper body. A space between an inner circumferential surface of the receiving portion and an outer circumferential surface of the rotor is divided into a plurality of pressure chambers. A rotation speed of the rotor is controlled to be at a low speed by a flow resistance of fluid filled in each of the pressure chambers when the fluid flows through gaps between an inner surface of the receiving portion and an outer surface of the rotor opposed to each other in a direction of a rotation axis of the rotor. The damper body and the rotor are relatively movable in the direction of the rotation axis of the rotor.

10 Claims, 24 Drawing Sheets

(51) Int. Cl.
*F16F 9/48* (2006.01)
*F16F 9/14* (2006.01)
*E05D 3/14* (2006.01)
*E05F 3/14* (2006.01)
*E05F 5/00* (2006.01)
*F16C 11/04* (2006.01)

(52) U.S. Cl.
CPC .............. *E05F 5/006* (2013.01); *F16C 11/04* (2013.01); *F16F 9/14* (2013.01); *F16F 9/145* (2013.01); *F16F 9/48* (2013.01); *E05Y 2201/254* (2013.01); *E05Y 2201/266* (2013.01); *E05Y 2201/624* (2013.01); *E05Y 2600/10* (2013.01); *E05Y 2900/20* (2013.01); *Y10T 16/54* (2015.01)

(56) References Cited

U.S. PATENT DOCUMENTS

| | | | |
|---|---|---|---|
| 5,855,518 A | 1/1999 | Tanaka et al. | |
| 6,085,384 A * | 7/2000 | Bivens | 16/54 |
| 6,336,252 B1 * | 1/2002 | Bando | 16/307 |
| 6,591,454 B2 * | 7/2003 | Brustle | 16/374 |
| 7,275,284 B2 * | 10/2007 | Lautenschlager et al. | 16/287 |
| 7,886,408 B2 * | 2/2011 | Lautenschlager | 16/286 |
| 8,640,305 B2 * | 2/2014 | Pecar et al. | 16/50 |
| 2002/0043127 A1 | 4/2002 | Takahashi | |
| 2002/0050025 A1 | 5/2002 | Salice | |
| 2005/0071953 A1 | 4/2005 | Salice | |
| 2005/0071954 A1 | 4/2005 | Salice | |
| 2009/0096246 A1 * | 4/2009 | Patzer et al. | 296/146.11 |
| 2011/0005032 A1 * | 1/2011 | Domenig et al. | 16/54 |
| 2011/0056782 A1 | 3/2011 | Gustafsson | |
| 2014/0215756 A1 * | 8/2014 | Oshima et al. | 16/50 |
| 2014/0230189 A1 * | 8/2014 | Oshima et al. | 16/308 |

FOREIGN PATENT DOCUMENTS

| | | |
|---|---|---|
| JP | 5-246281 A | 9/1993 |
| JP | 06-323055 A | 11/1994 |
| JP | 9-32864 A | 2/1997 |
| JP | 11-217967 A | 8/1999 |
| JP | 2001-187934 A | 7/2001 |
| JP | 3213287 B2 | 10/2001 |
| JP | 2004-068592 A | 3/2004 |
| JP | 2004-076941 A | 3/2004 |
| JP | 2004-162523 A | 6/2004 |
| JP | 3751226 B2 | 3/2006 |
| JP | 2006-242253 A | 9/2006 |
| JP | 2010-528938 A | 8/2010 |
| JP | 2010-535955 A | 11/2010 |
| WO | 88/10377 A1 | 12/1988 |
| WO | 2009/021799 A1 | 2/2009 |

OTHER PUBLICATIONS

International Search Report for corresponding International Application No. PCT/JP2012/071795, mailed Oct. 23, 2012 (1 page).
International Search Report for corresponding International Application No. PCT/JP2012/071799, mailed Oct. 16, 2012 (2 pages).
International Search Report for corresponding International Application No. PCT/JP2012/071805, mailed Oct. 23, 2012 (2 pages).

* cited by examiner

ROTARY DAMPER AND HINGE DEVICE WITH DAMPER

FIELD OF THE INVENTION

The present invention relates to a rotary damper and a hinge device with damper in which the rotary damper is used.

BACKGROUND OF THE INVENTION

As disclosed in Patent Document 1 listed below, a hinge device with damper generally includes a housing-side mounting member to be attached to a housing and a door-side mounting member to be attached to a door. The door-side mounting member is rotatably connected to the housing-side mounting member via a first link and a second link. Accordingly, when the housing-side mounting member is attached to the housing and the door-side mounting member is attached to the door, the door is rotatably supported by the housing via the hinge device.

The hinge device further includes a rotary damper. The rotary damper controls a rotation speed of the first link to be at a low speed, thereby controlling rotation speeds of the door-side mounting member and the door to be at low speeds.

PRIOR ART DOCUMENTS

Patent Documents

Patent Document 1: Japanese Unexamined Patent Application Publication No. 2004-68592

SUMMARY OF THE INVENTION

Problem to be Solved by the Invention

Favorite rotation speeds of a door at low rotation speeds differ from one user to another. However, since a conventional hinge device with damper has a constant damping effect in controlling a rotation speed of a door to be at a low speed, there is a problem that in the conventional hinge device, the rotation speed of the door at low rotation speeds cannot be adjusted according to the user's preference.

Solution to the Problem

To solve the problem mentioned above, a first aspect of the present invention provides a rotary damper including a damper body having a receiving portion; and a rotor rotatably disposed in the receiving portion of the damper body; a space between an inner circumferential surface of the receiving portion and an outer circumferential surface of the rotor being divided into a plurality of pressure chambers, a rotation speed of the rotor being controlled to be at a low speed by a flow resistance of fluid filled in each of the pressure chambers when the fluid flows through gaps between an inner surface of the receiving portion and an outer surface of the rotor opposed to each other in a direction of the rotation axis of the rotor, wherein: the damper body and the rotor are relatively movable in the direction of the rotation axis of the rotor; and the rotary damper further includes a position adjustment mechanism that causes one of the damper body and the rotor to be moved in the direction of the rotation axis of the rotor, thereby adjusting a position of the one of the damper body and the rotor with respect to the other of the damper body and the rotor.

In this case, it is preferable that the rotary damper further includes fixed members, positions of the fixed members being fixed in the direction of the rotation axis of the rotor; the position adjustment mechanism is disposed between the fixed members and the one of the damper body and the rotor; and the position adjustment mechanism causes one of the damper body and the rotor to be moved with respect to the fixed members in the direction of the rotation axis of the rotor, thereby adjusting the position of the one of the damper body and the rotor with respect to the other of the damper body and the rotor in the direction of the rotation axis of the rotor.

Preferably, the fixed members are disposed opposed to the one of the damper body and the rotor in the direction of the rotation axis of the rotor; the position adjustment mechanism includes a cam mechanism disposed between the one of the damper body and the rotor and the fixed members; the cam mechanism includes a cam member formed separately from the damper body and the rotor; the cam member is disposed such that the cam member is rotatable about the rotation axis of the rotor in a condition where the cam member is contacted with surfaces of the fixed members opposed to the one of the damper body and the rotor; and a cam portion is disposed in a surface of the cam member opposed to the one of the damper body and the rotor, the cam portion being able to be abutted against the one of the damper body and the rotor, thereby causing the one of the damper body and the rotor to be moved in the direction of the rotation axis of the rotor according to a rotation of the cam member.

Preferably, the cam mechanism further includes a second cam member formed separately from the damper body, the rotor and the fixed members; the second cam member is disposed such that the second cam member is non-rotatable about the rotation axis of the rotor in a condition where the second cam member is contacted with a surface of the one of the damper body and the rotor opposed to the cam member; an abutment portion is disposed in a surface of the second cam member opposed to the cam member, the abutment portion being abutted against the cam portion; and the cam member causes the second cam member to be moved in the direction of the rotation axis of the rotor according to a rotation of the second cam member, thereby causing the one of the damper body and the rotor to be moved in the direction of the rotation axis of the rotor.

To solve the problem mentioned above, a second aspect of the present invention provides a hinge device with damper including: a housing-side mounting member; a first link having one end portion thereof rotatably connected to the housing-side mounting member; a second link having one end portion thereof rotatably connected to the housing-side mounting member; a door-side mounting member, the other end portion of the first link and the other end portion of the second link rotatably connected to the door-side mounting member; and a rotary damper that controls a rotation speed of the first link with respect to the housing-side mounting member to be at a low speed, the rotary damper including a damper body and a rotor, the damper body having a receiving portion, the rotor disposed in the receiving portion of the damper body such that the rotor is rotatable about a rotation axis of the rotor, a space between an inner circumferential surface of the receiving portion and an outer circumferential surface of the rotor being divided into a plurality of pressure chambers, a rotation speed of the rotor being controlled to be at a low speed by a flow resistance of fluid filled in each of the pressure chambers when the fluid flows through a gap between an inner surface of the receiving portion and an outer surface of the rotor opposed to each other in a direction of a rotation axis of the rotor, wherein: the damper body and the rotor are relatively movable in the direction of the rotation axis of the rotor; and the hinge device with damper further includes a position adjustment mechanism that causes one of the damper body and the rotor to be moved in the direction of the rotation axis of the rotor, thereby adjusting a position of the one of the damper body and the rotor with respect to the other of the damper body and the rotor.

Preferably, the rotary damper is disposed with a rotation axis of the rotor coinciding with a center of rotation of the one end portion of the first link with respect to the housing-side mounting member; the position adjustment mechanism is disposed between one of the housing-side mounting member and the first link and the one of the damper body and the rotor; and the position adjustment mechanism causes the one of the damper body and the rotor to be moved with respect to the one of the housing-side mounting member and the first link in the direction of the rotation axis of the rotor, thereby causing the one of the damper body and the rotor to be moved with respect to the other of the damper body and the rotor in the direction of the rotation axis of the rotor.

Preferably, the position adjustment mechanism includes a cam mechanism disposed between the one of the housing-side mounting member and the first link and the one of the damper body and the rotor; the cam mechanism includes a cam member formed separately from the damper body and the rotor; the cam member is disposed such that the cam member is rotatable about the rotation axis of the rotor in a condition where the cam member is contacted with a surface of the one of the housing-side mounting member and the first link opposed to the one of the damper body and the rotor; and a cam portion is disposed in a surface of the cam member opposed to the one of the damper body and the rotor, the cam portion being abutted against the one of the damper body and the rotor, thereby causing the one of the damper body and the rotor to be moved in the direction of the rotation axis of the rotor according to a rotation of the cam member.

Preferably, a first side plate and a second side plate intersecting with the rotation axis of the rotor are formed in opposite side portions of the housing-side mounting member in the direction of the rotation axis of the rotor, thereby the housing-side mounting member having a U-shaped cross-sectional configuration; the one end portion of the first link, the one end portion of the second link, the rotary damper and the cam member are received in the housing-side mounting member; an operation window is formed through the first side plate of the housing-side mounting member in the direction of the rotation axis of the rotor, the operation window having a configuration of an elongated hole extending along a circular arc about the rotation axis of the rotor; the cam member is provided with an operation tab; and the operation tab is disposed in the operation window such that a position of the operation tab can be adjusted in a longitudinal direction of the operation window so that the operation tab can be manipulated from outside the housing-side mounting member to cause the cam member to be rotated.

Preferably, the cam mechanism further includes a second cam member formed separately from the first link, the damper body and the rotor; the second cam member is disposed such that the second cam member is non-rotatable about the rotation axis of the rotor in a condition where the second cam member is contacted with a surface of the one of the damper body and the rotor opposed to the cam member; an abutment portion is disposed in a surface of the second cam member opposed to the cam member, the abutment portion being abutted against the cam portion; and the cam member causes the second cam member to be moved in the direction of the rotation axis of the rotor according to a rotation of the cam member, thereby causing the one of the damper body and the rotor to be moved in the direction of the rotation axis of the rotor.

Advantageous Effects of the Invention

According to the first aspect and the second aspect of the present invention having the features mentioned above, when one of the damper body and the rotor is moved by the position adjustment mechanism to adjust a position thereof with respect to the other of the damper body and the rotor, a gap between the inner surface of the receiving portion and the end surface of the rotor opposed to each other in the direction of the rotation axis of the rotor is changed to be increased or decreased. As a result, a flow resistance of the gap against the fluid is changed, thereby a damping effect of the damper mechanism being changed. Accordingly, the rotation speed of the door at a low speed can be adjusted appropriately by adjusting positions of the damper body and the rotor in the direction of rotation axis by the position adjustment mechanism.

DESCRIPTION OF THE PREFERRED EMBODIMENTS

A best mode for carrying out the invention will be described hereinafter with reference to the drawings.

FIGS. 1 to 29 show a first embodiment of a hinge device with damper according to the present invention. As shown in FIGS. 1 to 8, the hinge device with damper 1 of this embodiment includes as major constituents thereof a base 2, a hinge body (housing-side mounting member) 3, an inner link (first link) 4, an outer link (second link) 5, a cupped member (door-side mounting member) 6, a torsion coil spring 7 and a rotary damper 8.

Figure 1:
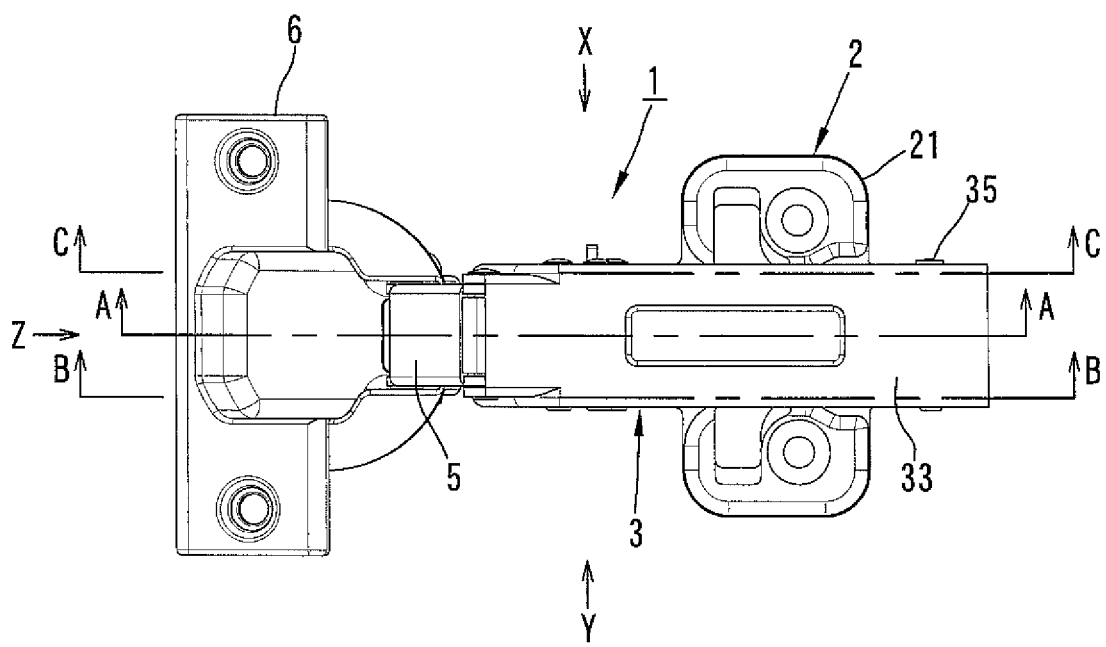
FIG. 1 is a plan view of a first embodiment of the present invention, showing a door-side mounting member in an open position.
Figure 2:
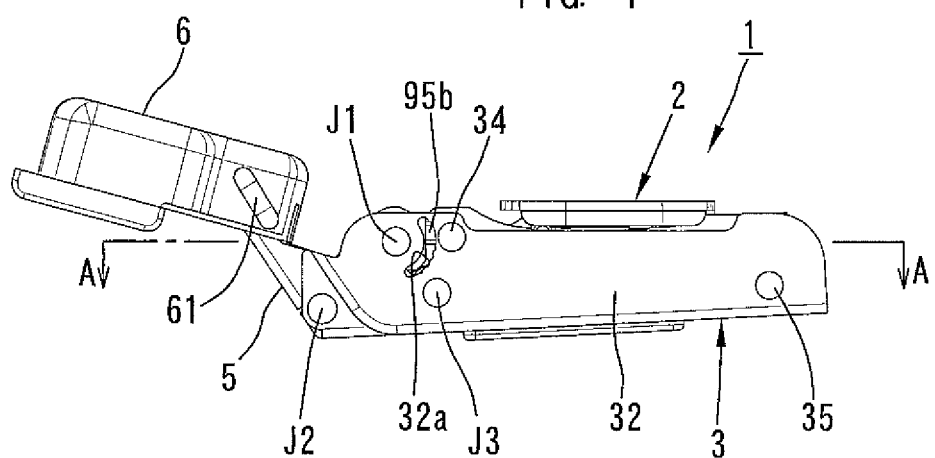
FIG. 2 is a view on arrow X of FIG. 1.
Figure 3:
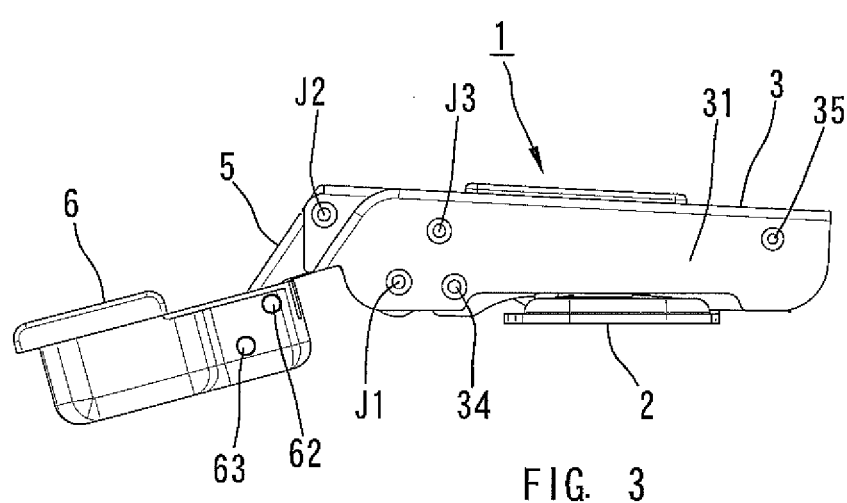
FIG. 3 is a view on arrow Y of FIG. 1.
Figure 4:
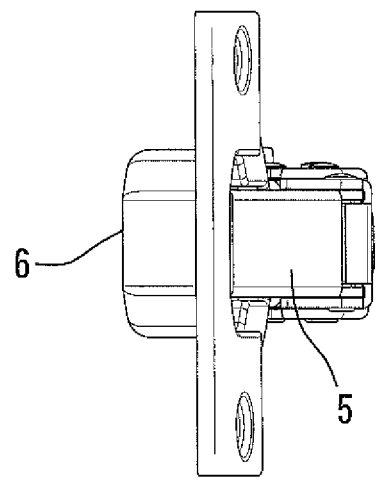
FIG. 4 is a view on arrow Z of FIG. 1.
Figure 5:
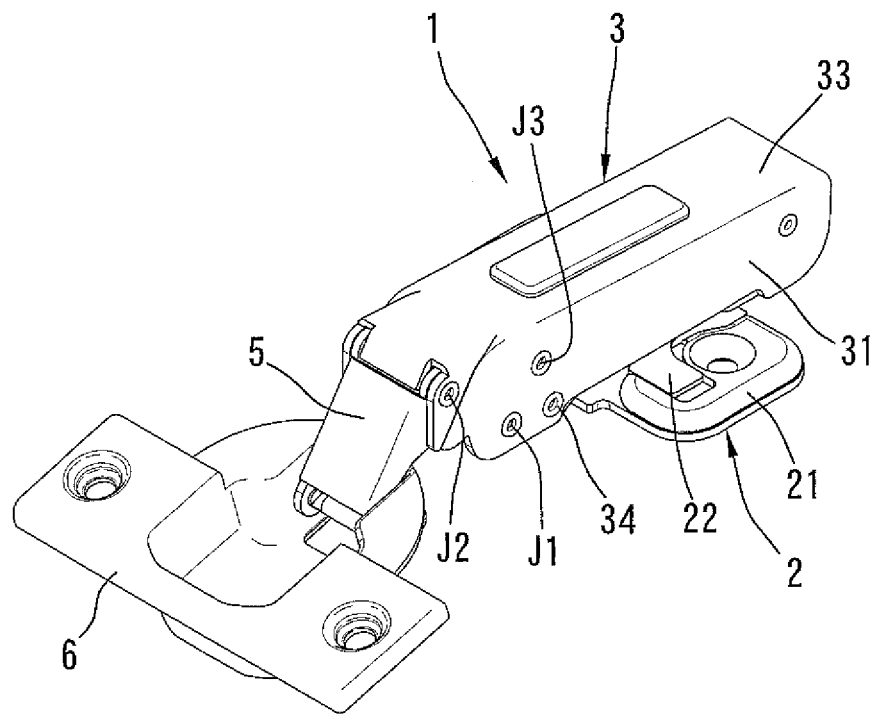
FIG. 5 is a perspective view of the first embodiment, showing the door-side mounting member in the open position.
Figure 6:
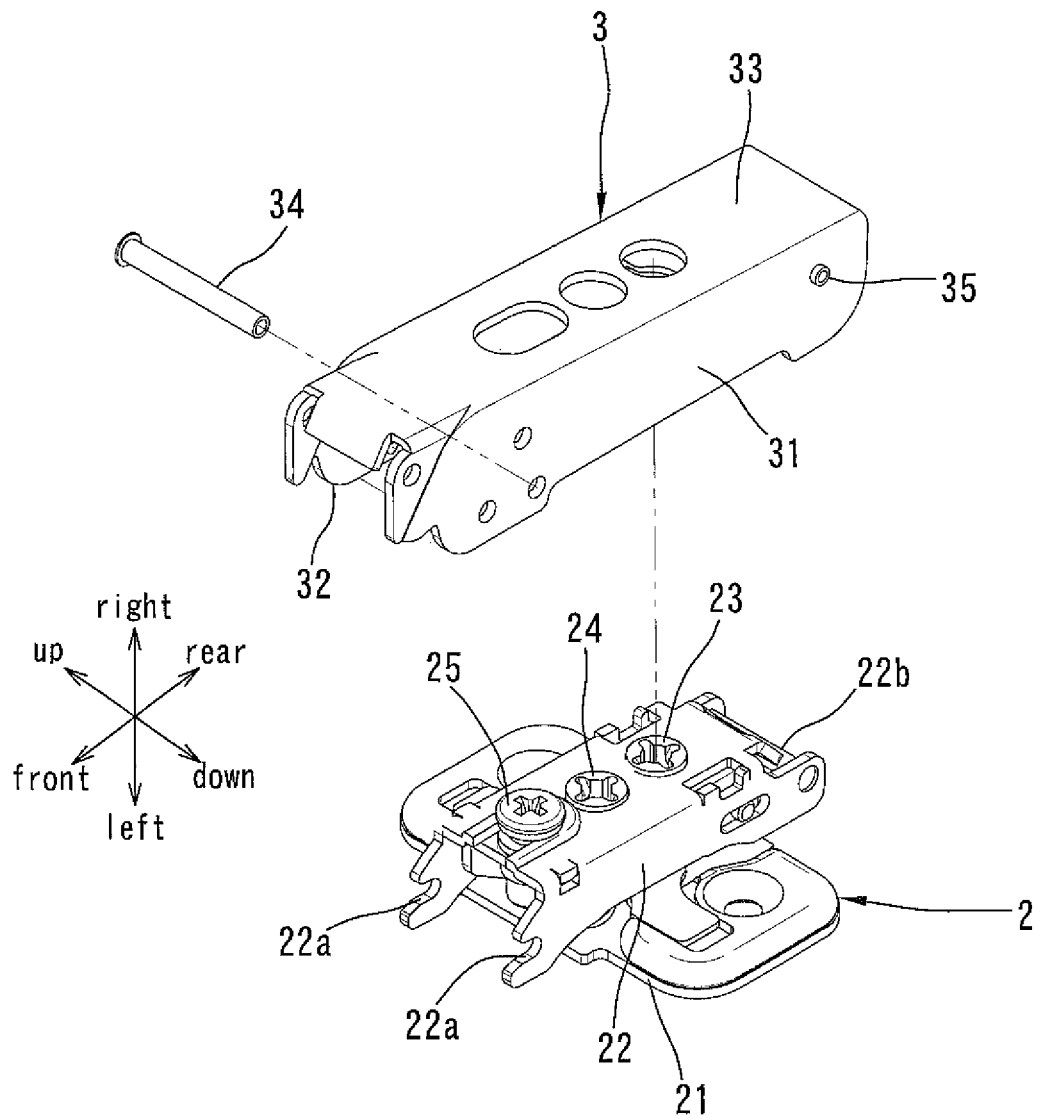
FIG. 6 is an exploded perspective view of a base and a housing-side mounting member used in the first embodiment.
Figure 7:
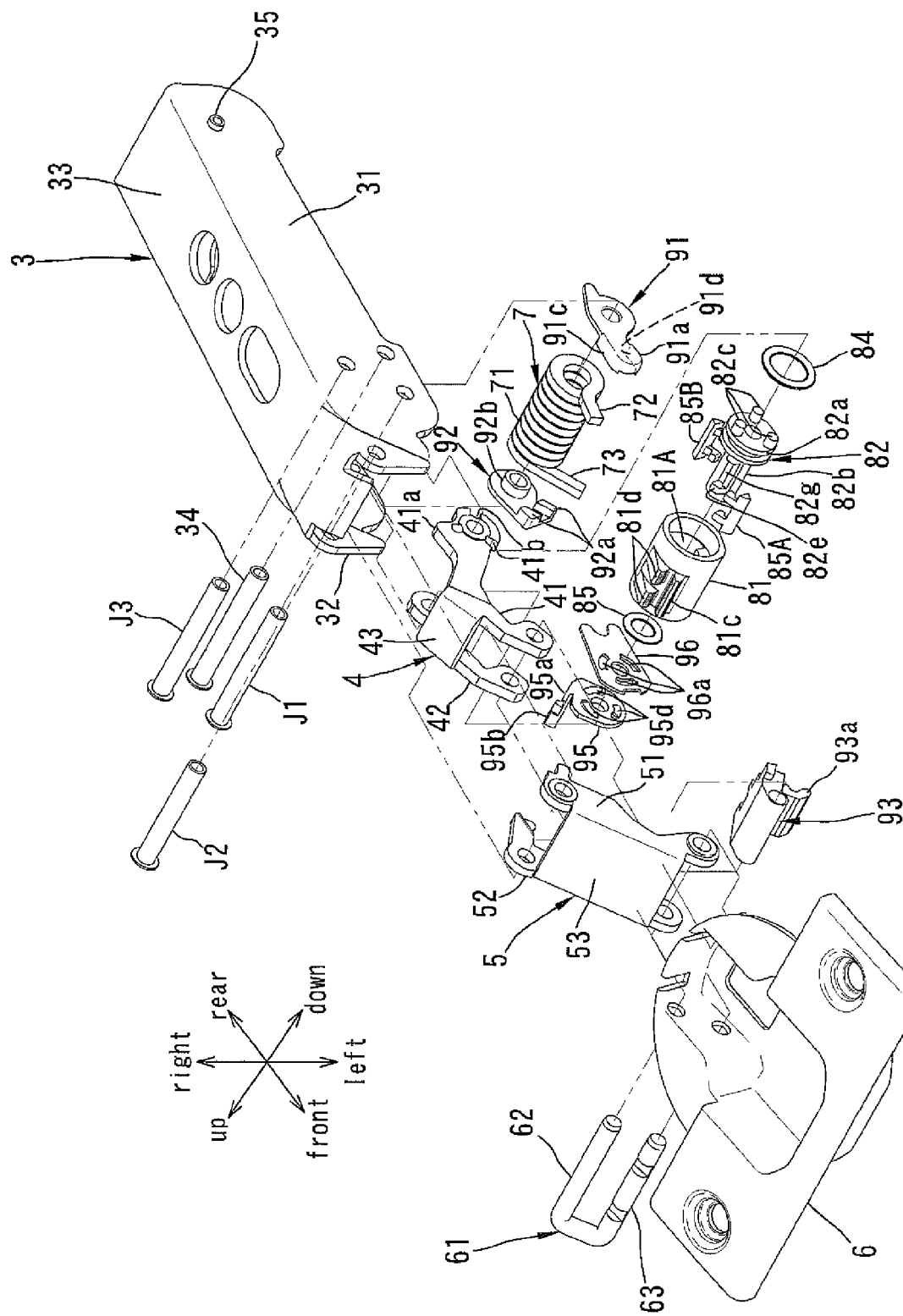
FIG. 7 is an exploded perspective view of the housing-side mounting member and the door-side mounting member and other parts disposed between them used in the first embodiment.

The base 2 is provided for removably attaching the hinge body 3 to an inner surface of a side wall of a housing (not shown) having an opening in a front thereof. The base 2 includes a base plate 21 and a movable plate 22. The base plate 21 is attached to a front end portion of an inner surface of a left side wall, i.e., an end portion of the left side wall on the opening side, of the housing. Alternatively, the base plate 21 may be attached to a front end portion of an inner surface of a right side wall of the housing. For the ease of description, front-rear, left-right and vertical directions used in describing features of the hinge device 1 hereinafter respectively refer to front-rear, left-right and vertical directions of the housing. The front-rear, left-right and vertical directions of the housing are as shown in FIGS. 6 and 7. It is to be understood that the hinge device 1 is not limited to such front-rear, left-right and vertical directions.

The movable plate 22 is attached to the base plate 21 such that a position of the movable plate 22 can be adjusted in the front-rear direction and the vertical direction. When an adjustment shaft 23 is rotated, the position of the movable plate 22 is adjusted in the front-rear direction. When an adjustment shaft 24 is rotated, the position of the movable plate 22 is adjusted in the vertical direction. When an adjustment bolt 25 is rotated, the position of a front end portion of the movable plate 22 is adjusted in the left-right direction.

An engagement recess 22a is formed in the front end portion of the movable plate 22. The engagement recess 22a is open toward the front. An engagement shaft 22b is fixed to a rear end portion of the movable plate 22 with a longitudinal direction of the engagement shaft 22b oriented in the vertical direction.

Figure 8:
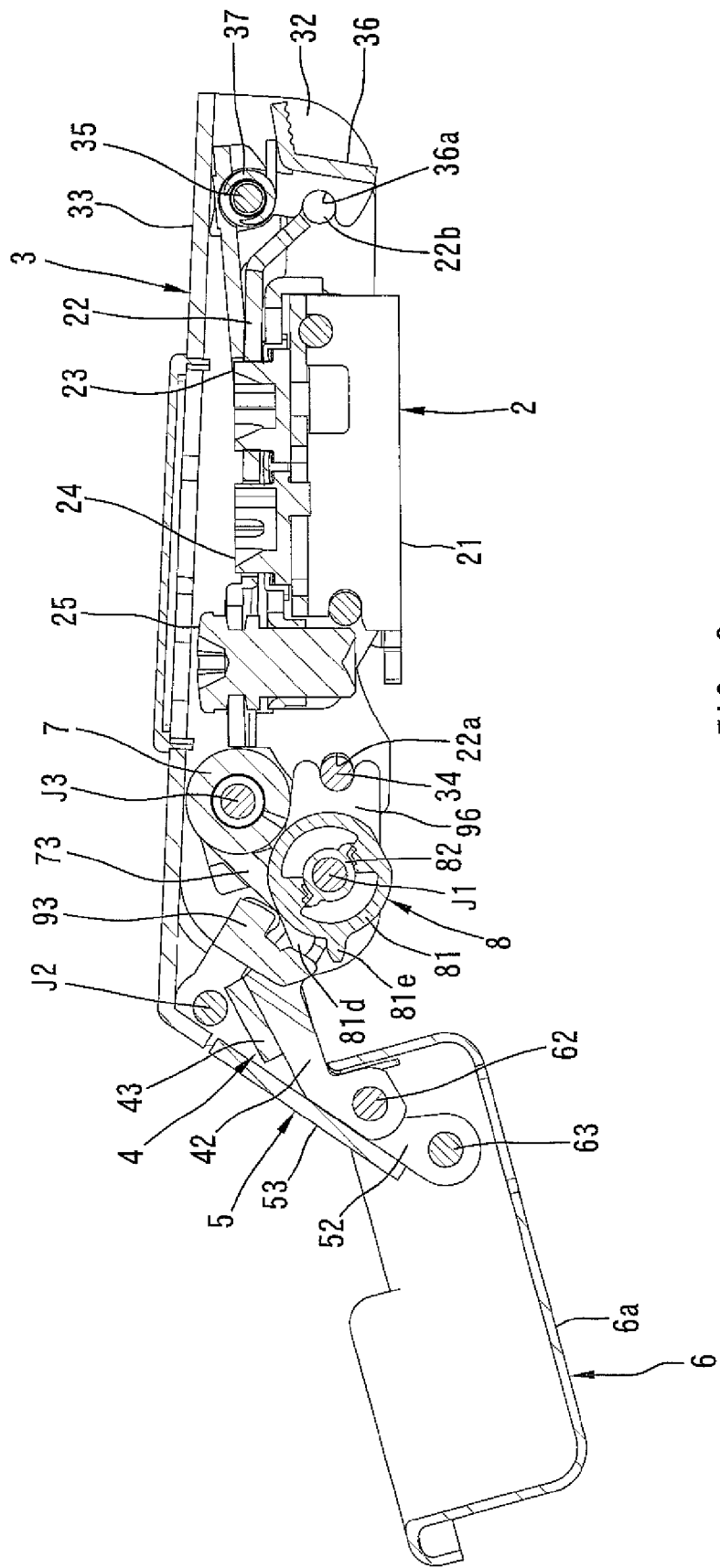
FIG. 8 is an enlarged cross-sectional view taken along line A-A of FIG. 1.
Figure 9:
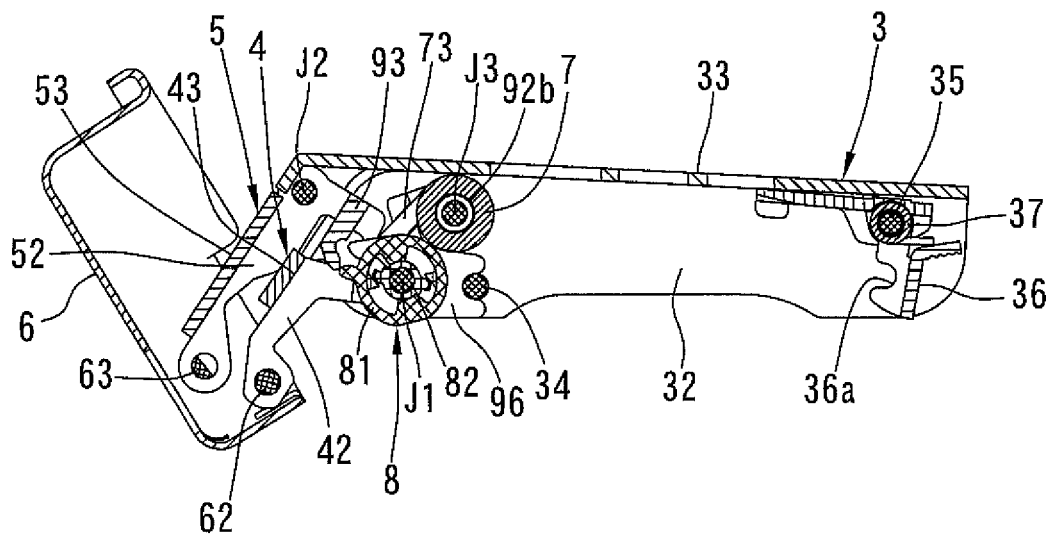
FIG. 9 is a view similar to FIG. 8, showing the door-side mounting member in an intermediate position between a closed position and the open position.

As shown in FIGS. 6 to 8, the hinge body 3 includes a pair of side plates (second and first side plates) 31, 32 and a connecting plate 33. The pair of side plates 31, 32 are disposed such that longitudinal directions of the pair of side plates 31, 32 are oriented in the front-rear direction and the side plates 31, 32 are opposed to each other in the vertical direction. The connecting plate 33 is integrally disposed in right side portions (upper side portions in FIG. 6) of longer side portions of the pair of side plates 31, 32. Thereby, the hinge body 3 has a U-shaped cross-section. The hinge body 3 is disposed with an open portion thereof oriented toward the base 2.

The movable plate 22 is disposed inside the hinge body 3. As shown in FIGS. 7 and 8, opposite end portions of an engagement shaft 34 are respectively fixed to front end portions of the side plates 31, 32 of the hinge body 3. A longitudinal direction of the engagement shaft 34 is oriented in the vertical direction. The engagement shaft 34 is removably inserted in the engagement recess 22a of the movable plate 22. As shown in FIG. 8, opposite end portions of a support shaft 35 are respectively fixed to rear end portions of the side plates 31, 32 of the hinge body 3. A longitudinal direction of the support shaft 35 is oriented in the vertical direction. An engagement member 36 is rotatably disposed at the support shaft 35. The engagement member 36 is rotatably biased in a clockwise direction of FIG. 8 by a coil spring 37. An engagement recess 36a is formed in the engagement member 36. The engagement shaft 22b disposed in the rear end portion of the movable plate 22 is removably inserted in the engagement recess 36a. The engagement shaft 34 is removably inserted in the engagement recess 22a and the engagement shaft 22b is removably inserted in the engagement recess 36a of the engagement member 36. Thereby, the hinge body 3 is removably attached to the base 2, and thereby removably attached to the housing. An attaching structure of the hinge body 3 to the housing is not limited to the one described above, but other structures that are known in the art may be adopted. Alternatively, the hinge body 3 may be directly fixed to the housing, for example, by forming vertical flanges protruding upward or downward respectively in the side plates 31, 32, and fixing the vertical flanges to the inner surface of the left side wall or the right side wall of the housing.

One end portions of the inner link 4 and the outer link 5 are respectively rotatably connected to the front end portions of the side plates 31, 32 of the hinge body 3. Specifically, opposite end portions of central shafts J1, J2 are respectively fixed in the front end portions of the side plates 31, 32. Longitudinal directions of the central shafts J1, J2 are oriented in the vertical direction. The inner link 4 is composed of a pair of side plates 41, 42 opposed to each other in the vertical direction and a connecting plate 43 connecting the pair of side plates 41, 42 at longer side portions of the side plates 41, 42. One end portions of the side plates 41, 42 are disposed between the side plates 31, 32 and are connected to the side plates 31, 32 such that the side plates 41, 42 are rotatable about the central shaft J1 in the horizontal direction. By this arrangement, one end portion of the inner link 4 is connected to a front end portion of the hinge body 3 such that the inner link 4 is rotatable in the horizontal direction.

The outer link 5 is composed of a pair of side plates 51, 52 opposed to each other in the vertical direction and a connecting plate 53 connecting the pair of side plates 51, 52 at longer side portions of the side plates 51, 52. One end portions of side plates 51, 52 are disposed between the side plates 31, 32 and are connected to the side plates 31, 32 such that the side plates 51, 52 are rotatable about the central shaft J2 in the horizontal direction. By this arrangement, one end portion of the outer link 5 is connected to the front end portion of the hinge body 3 such that the outer link 5 is rotatable in the horizontal direction.

The cupped member 6 is fixed to a rear surface of a door (not shown), that is a surface of the door that faces the front surface of the housing when the door is in the closed position. A connector 61 having a generally U-shaped configuration is fixed to the cupped member 6. The connector 61 includes a pair of shaft portions 62, 63 disposed parallel to each other. Longitudinal directions of the pair of shaft portions 62, 63 are oriented in the vertical direction. Accordingly, the shaft portions 62, 63 are arranged parallel to the central shafts J1, J2.

The other end portions of the side plates 41, 42 of the inner link 4 are connected to the cupped member 6 such that the side plates 41, 42 are rotatable about the shaft portion 62 in the horizontal direction. The other end portions of the side plates 51, 52 of the outer link 5 are connected to the cupped member 6 such that the side plates 51, 52 are rotatable about the shaft portion 63 in the horizontal direction. By this arrangement, the cupped member 6 is connected to the hinge body 3 such that the cupped member 6 is rotatable in the horizontal direction via the inner link 4 and the outer link 5. Thereby, the door is connected to the housing such that the door is rotatable in the horizontal direction via the hinge device 1.

Figure 10:
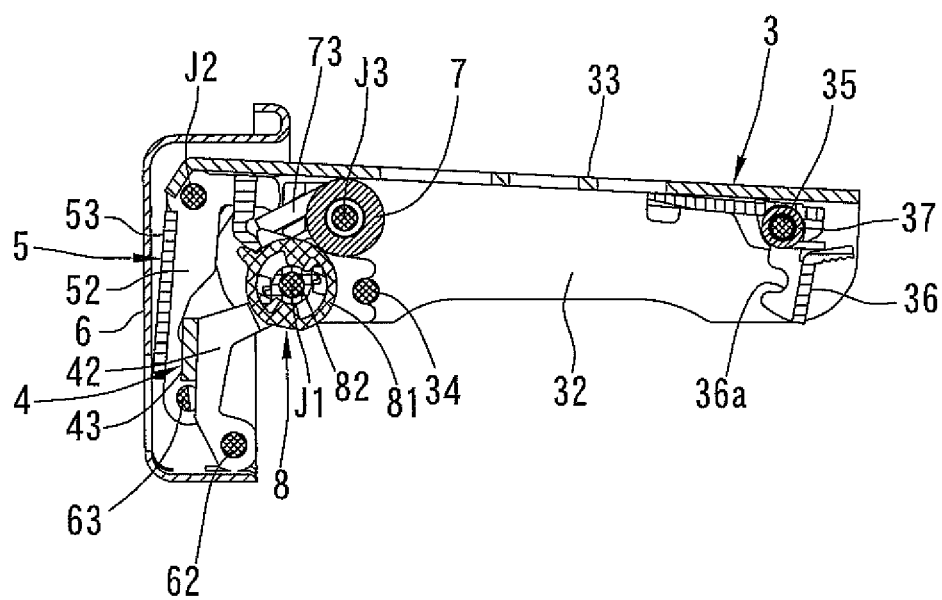
FIG. 10 is a view similar to FIG. 8, showing the door-side mounting member in the closed position.
Figure 11:
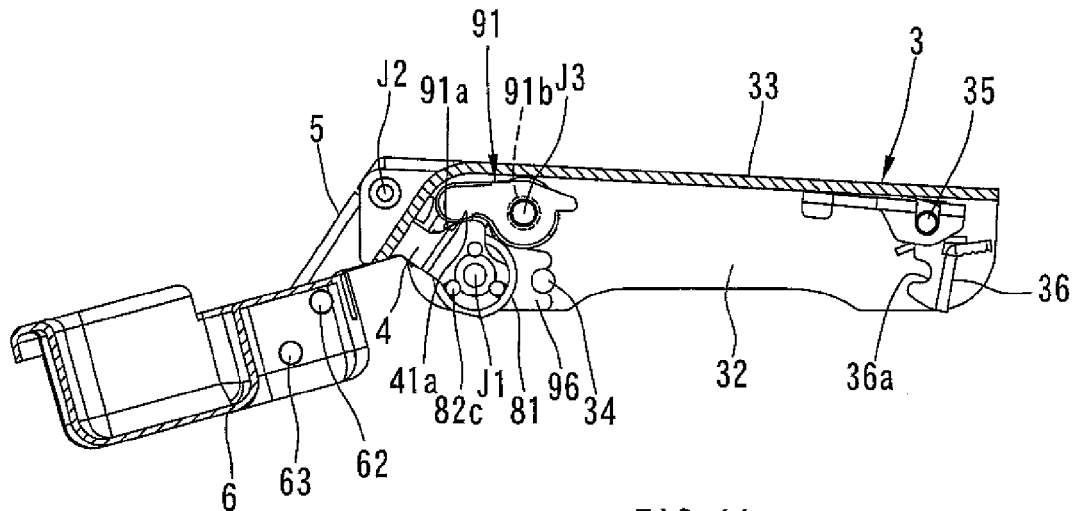
FIG. 11 is a partially-omitted cross-sectional view taken along line B-B of FIG. 1.
Figure 13:
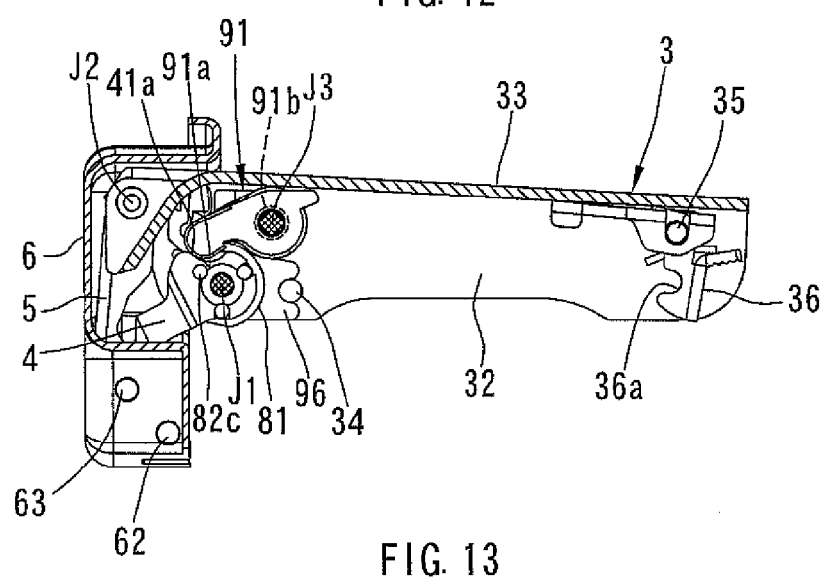
FIG. 13 is a cross-sectional view similar to FIG. 11, showing the door-side mounting member in the closed position.

The cupped member 6 is rotatable with respect to the hinge body 3 between a closed position shown in FIGS. 10 and 13 and an open position shown in FIGS. 8 and 11. As shown in FIG. 10, the closed position of the cupped member 6 is determined by the abutment of the connecting plate 53 of the outer link 5 against a bottom 6a of the cupped member 6. However, the cupped member 6 does not actually reach the closed position when the hinge device 1 is mounted to the housing. This is because the door is abutted against the front surface of the housing before the outer link 5 is abutted against the cupped member 6. Positions of the cupped member 6 and the door when the door is abutted against the front surface of the housing are referred to as "closed positions" hereinafter. The open position of the cupped member 6 is determined by the abutment of the side plates 41, 42 of the inner link 4 against the cupped member 6.

As shown in FIGS. 7 and 8, opposite end portions of a support shaft J3 are supported by the side plates 31, 32 of the hinge body 3. A longitudinal direction of the support shaft J3 is oriented in the vertical direction. The support shaft J3 is disposed slightly behind the central shafts J1, J2 and to the right of the central shafts J1, J2. A coil portion 71 of the torsion coil spring (rotationally biasing mechanism) 7 is disposed around the support shaft J3. The coil portion 71 is composed of a wound wire rod having a rectangular cross-section.

Protrusions 72, 73 are provided at opposite end portions of the coil portion 71 of the torsion coil spring 7. The protrusions 72, 73 are one end portion and the other end portion of the wire rod constituting the coil portion 71. The protrusions 72, 73 are protruded from the coil portion 71 outward in a radial direction.

Figure 12:
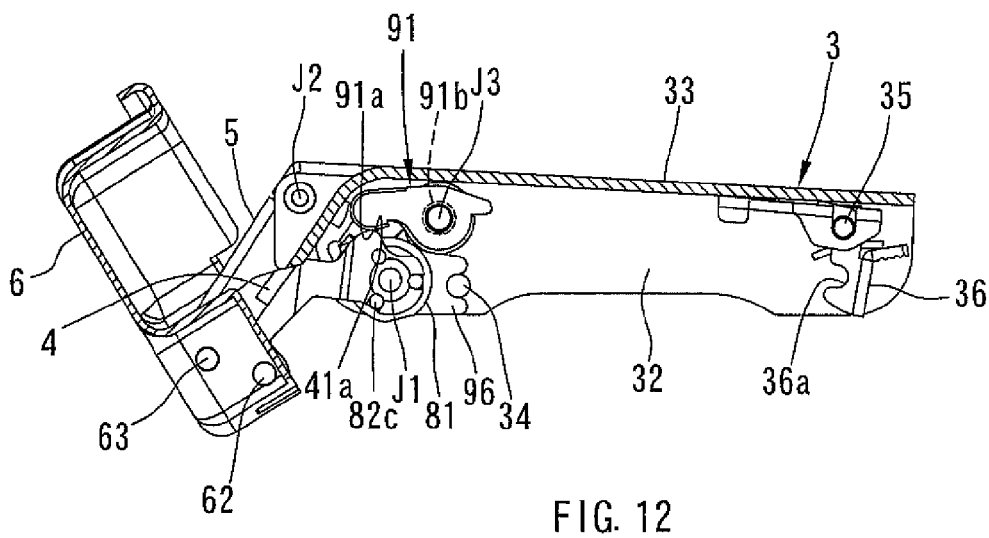
FIG. 12 is a cross-sectional view similar to FIG. 11, showing the door-side mounting member in the intermediate position.

As shown in FIGS. 11 to 13, the protrusion (one end portion) 72 of the torsion coil spring 7 is abutted against one of the side plates 41 of the inner link 4 via a cam member 91. The cam member 91 has a configuration of a flat plate. The cam member 91 is disposed between the side plate 31 of the hinge body 3 and the coil portion 71 of the torsion coil spring 7. The support shaft J3 is rotatably disposed through the cam member 91. Accordingly, the cam member 91 is rotatably supported by the support shaft J3. A pair of protrusions 91c, 91d are disposed in a surface of the cam member 91 opposed to the protrusion 72. The pair of protrusions 91c, 91d are spaced from each other. The protrusion 72 of the torsion coil spring 7 is disposed between the pair of protrusions 91c, 91d such that the protrusion 72 is non-movable in a circumferential direction of the coil portion 71. As a result, the cam member 91 is rotationally biased about the support shaft J3 by the torsion coil spring 7.

A cam surface 91a is formed in a portion of a front end portion of the cam member 91 that is opposed to the side plate 41. A cam surface 41a is formed in the side plate 41 that is opposed to the cam surface 91a. The cam surfaces 91a, 41a are abutted against each other by the torsion coil spring 7. Accordingly, rotationally biasing force of the torsion coil spring 7 acts on the inner link 4 via the cam surfaces 91a, 41a. Specifically, the rotationally biasing force of the torsion coil spring 7 that acts on the inner link 4 does not act (the rotationally biasing force is zero) when the cupped member 6 is in the open position. When the cupped member 6 is rotated from the open position toward the closed position, the rotationally biasing force of the torsion coil spring 7 acts to rotate the cupped member 6 toward the closed position. Moreover, the rotationally biasing force acting on the inner link 4 is increasingly increased as the cupped member approaches the closed position. The cam surfaces 91a, 41a are formed in such a manner that allows the rotationally biasing force to act on the inner link 4 in this way. It is to be understood that it is also possible to form the cam surfaces 91a, 41a in such a manner that allows the rotationally biasing force to act on the inner link 4 in a different mode from the one mentioned above. In this way, when the protrusion 72 is contacted with the inner link 4 via the cam member 91, the rotationally biasing force acting on the inner link 4 is allowed much greater flexibility in the mode of action compared with when the protrusion 72 is directly contacted with the inner link 4.

As mentioned above, except when the cupped member 6 is in the open position, the torsion coil spring 7 rotationally biases the inner link 4 in a counter-clockwise direction of FIGS. 11 to 13 about the central shaft J1, thereby rotationally biasing the cupped member 6 in a direction from the open position toward the closed position (to be referred to as a "closing direction" hereinafter). Accordingly, when the cupped member 6 is rotated from the open position toward the closed position through a slight angle, 5 to 10 degrees, for example, the cupped member 6 is then rotated to the closed position and maintained at the closed position by the torsion coil spring 7. When the cupped member 6 is at the open position, a normal line to portions of the cam surfaces 91a, 41a contacted with each other (line of action of the rotationally biasing force of the torsion coil spring 7 acting on the inner link 4) orthogonally crosses an axis of the central shaft J1. Therefore, the inner link 4 is not rotationally biased by the rotationally biasing force of the torsion coil spring 7. The torsion coil spring 7 may bias the inner link 4 in other modes. For example, the rotationally biasing force of the torsion coil spring 7 may act on the inner link 4 only when the cupped member 6 is positioned between the closed position and a generally intermediate position between the open position and the closed position. But the rotationally biasing force of the torsion coil spring 7 may not act on the inner link 4 when the cupped member 6 is positioned between the intermediate position and the open position. Alternatively, as in a well-known hinge device, the torsion coil spring 7 may rotationally bias the inner link 4 such that the cupped member 6 is rotated in the closing direction when the cupped member 6 is positioned between the closed position and a predetermined neutral position (change point position). And the torsion coil spring 7 may rotationally bias the inner link 4 such that the cupped member 6 is rotated in a direction from the closed position toward the open position (to be referred to as an "opening direction" hereinafter) when the cupped member 6 is positioned between the neutral position and the open position.

Figure 14:
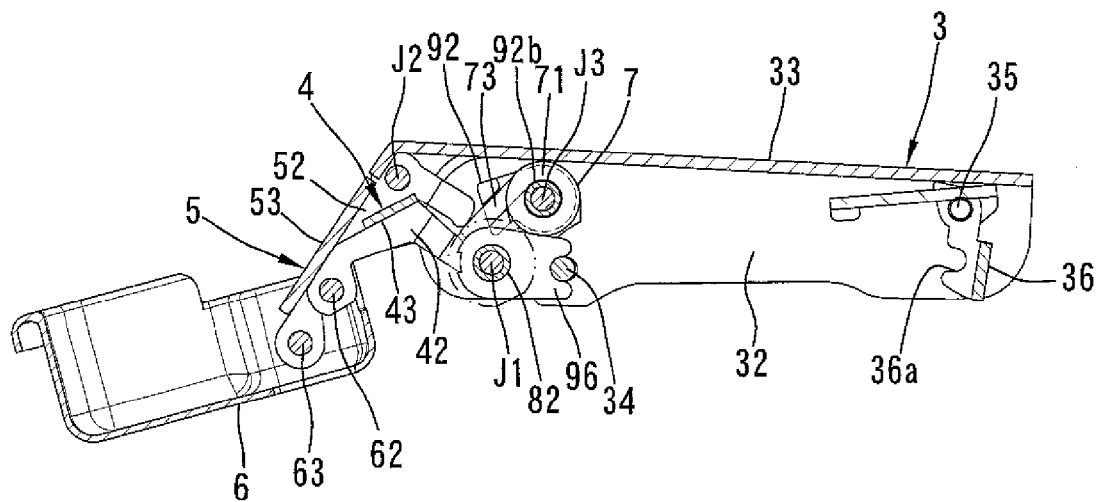
FIG. 14 is a partially-omitted cross-sectional view taken along line C-C of FIG. 1.
Figure 15:
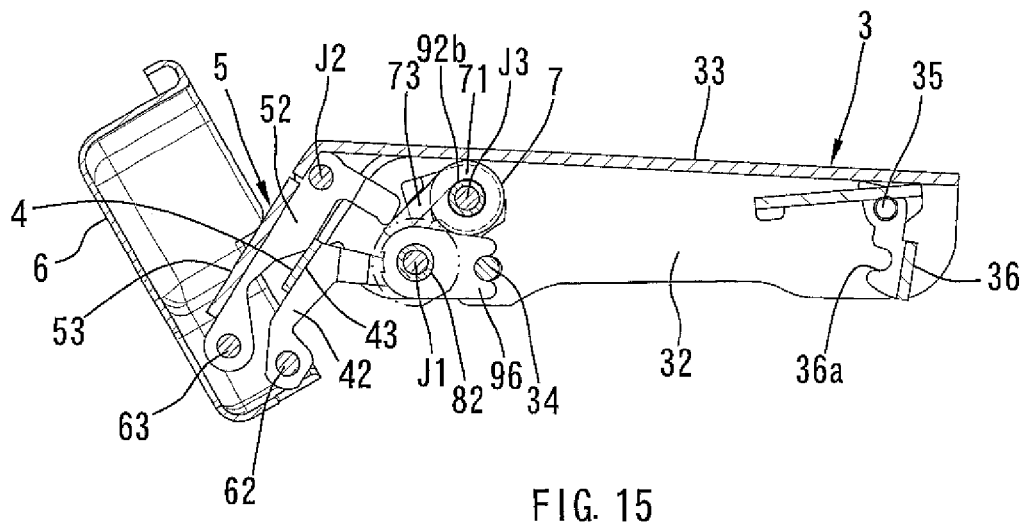
FIG. 15 is a cross-sectional view similar to FIG. 14, showing the door-side mounting member in the intermediate position.
Figure 16:
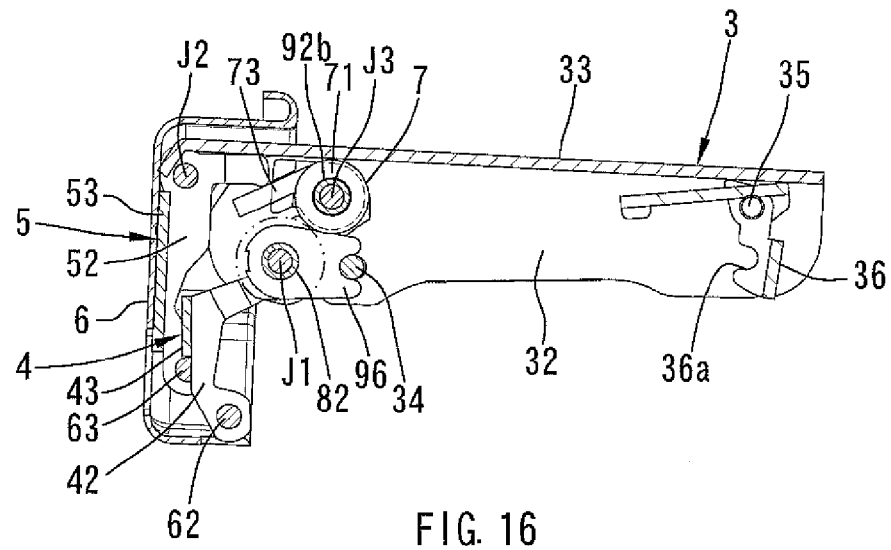
FIG. 16 is a cross-sectional view similar to FIG. 14, showing the door-side mounting member in the closed position.

As shown in FIGS. 14 to 16, the other protrusion (the other end portion) 73 of the torsion coil spring 7 is directly abutted against the outer link 5. Thereby, except when the cupped member 6 is in the open position, the torsion coil spring 7 rotationally biases the outer link 5 in a counter-clockwise direction of FIGS. 14 to 16 about the central shaft J2, thereby rotationally biasing the cupped member 6 in the closing direction. When the cupped member 6 is at the open position, a normal line to portions of the protrusion 73 and the outer link 5 contacted with each other (line of action of the rotationally biasing force of the torsion coil spring 7 acting on the outer link 5) orthogonally crosses an axis of the central shaft J2. Therefore, the outer link 5 is not rotationally biased by the rotationally biasing force of the torsion coil spring 7.

A magnitude of a biasing force of the one protrusion 72 biasing the inner link 4 via the cam member 91 and a magnitude of a biasing force of the other protrusion 73 biasing the outer link 5 is equal to each other. However, a magnitude of a rotationally biasing force (rotational moment) acting on the inner link 4 and a magnitude of a rotationally biasing force acting on the outer link 5 are different when the links 4, 5 are at most of the rotational positions except for some rotational positions. The cupped member 6 is rotationally biased by the rotationally biasing force acting on the links 4, 5. Therefore, in order to obtain a rotationally biasing force of desired magnitude suitable for the rotational position of the cupped member 6, it is required to properly adjust the rotationally biasing force acting on the links 4, 5. However, when both of the protrusions 72, 73 are formed in linear shapes, it is difficult to obtain a rotationally biasing force of desired magnitude acting on the cupped member 6 by properly adjusting the rotationally biasing force acting on the links 4, 5. In this respect, in the hinge device 1, the protrusion 72 is contacted with the inner link 4 via the cam member 91. Therefore, by designing a shape of the cam surface 91a of the cam member 91 taking into consideration the rotationally biasing force acting on the outer link 5, a rotationally biasing force acting on the cupped member 6 having a desired magnitude suitable for a rotational position of the cupped member 6 can be obtained.

While the one protrusion 72 of the torsion coil spring 7 is abutted against the side plate 41 of the inner link 4 via the cam member 91, the protrusion 72 may be directly abutted against the side plate 41. Alternatively, the protrusion 72 may be abutted against a portion of the connecting plate 43 adjacent to the side plate 41 directly or via a cam. The other protrusion 73 may be abutted against the side plate 52 of the outer link 5 via a cam member. Alternatively, the protrusion 73 may be abutted against a portion of the connecting plate 53 adjacent to the side plate 52. Alternatively, the protrusion 73 may be abutted against the connecting plate 33 of the hinge body 3.

As shown in FIG. 7 and FIGS. 11 to 13, a cylindrical portion 91b is formed in a surface of the cam member 91 opposed to the coil portion 71. The support shaft J3 is rotatably disposed through the cylindrical portion 91b. An outer diameter of the cylindrical portion 91b is slightly smaller than an inner diameter of the coil portion 71. The cylindrical portion 91b is relatively rotatably fitted in one end portion of the coil portion 71 with a slight gap therebetween. As a result, the one end portion of the coil portion 71 is securely supported by the cylindrical portion 91b without any inhibitory effect on expansion and contraction of diameter accompanying torsion of the torsion coil spring 7.

As shown in FIG. 7 and FIGS. 14 to 16, a spacer 92 is disposed between the side plate 32 of the hinge body 3 and the torsion coil spring 7. The support shaft J3 is rotatably disposed through the spacer 92. A pair of protrusions 92a, 92a are formed in a surface of the spacer 92 opposed to the protrusion 73 such that the protrusions 92a, 92a are spaced from each other. The protrusion 73 is disposed between the pair of protrusions 92a, 92a such that the protrusion 73 is non-movable in the circumferential direction of the coil portion 71. Accordingly, the spacer 92 is rotatable about an axis of the torsion coil spring 7 together with the protrusion 73. A cylindrical portion 92b is formed in a surface of the spacer 92 opposed to the coil portion 71. The support shaft J3 is rotatably disposed through the cylindrical portion 92b. An outer diameter of the cylindrical portion 92b is slightly smaller than the inner diameter of the coil portion 71. The cylindrical portion 92b is relatively rotatably fitted in the other end portion of the coil portion 71 with a slight gap therebetween. As a result, the other end portion of the coil portion 71 is securely supported by the cylindrical portion 92b without inhibitory effect on expansion and contraction of diameter accompanying the torsion of the torsion coil spring 7.

One protrusion 72 of the torsion coil spring 7 is contacted with the inner link 4 at the one side plate 41 only and the other protrusion 73 is contacted with the outer link 5 at the one side plate 52 only. That is, the inner link 4 is biased by the torsion coil spring 7 only at the one side plate 41 and the outer link 5 is biased by the torsion coil spring 7 only at one side plate 52. Accordingly, the inner link 4 and the outer link 5 are maintained at a certain attitude. Thus, the inner link 4 and the outer link 5 can be prevented from being rattled during the rotation of the door (cupped member 6) to be opened or closed.

Alternatively, it is also possible that the protrusions 72, 73 of the torsion coil spring 7 may be respectively contacted with the side plates 41, 42 of the inner link 4 to rotationally bias only the inner link 4 or the protrusions 72, 73 may be respectively contacted with the side plates 51, 52 of the outer link 5 to rotationally bias only the outer link 5, thereby rotationally biasing the cupped member 6. Alternatively, as in a conventional hinge device (see Japanese Unexamined Patent Application Publication No. H06-323055), two torsion coil springs may be coaxially aligned. One end portions of the torsion coil springs spaced from each other in a longitudinal direction of the torsion coil springs are respectively contacted with opposite side portions of one link, and the other end portions of the torsion coil springs adjacent to each other are contacted with a middle portion of the other link. As a result, the two torsion coil springs respectively rotationally bias the links.

However, when such a conventional mode of biasing is adopted, a biasing force of the torsion coil spring acting on each of the links are balanced between one side portion and the other side portion of each of the links (one side portion and the other side portion of each of the links in a direction of rotation axis). Therefore, the one side portion and the other side portion of the each of the links may be moved through a distance corresponding to a gap deriving from a dimension error between opposite side plates of a hinge body and a central shaft and a gap deriving from a dimension error between opposite side plates of the each of the links and the central shaft, depending on a load acting on a cupped member. This may cause the links to swingingly rattle, which may result in generation of noise at a time when the door is rotated to be opened or closed.

However, in the hinge device 1, the inner link 4 is biased by the torsion coil spring 7 only at the side plate 41 that is a one side portion of the inner link 4 in an axial direction of the central shaft J1. The other side plate 42 is not biased by the torsion coil spring 7. Therefore, the inner link 4 is maintained at a certain attitude and do not swinglingly rattle. Similarly, the outer link 5 is biased by the torsion coil spring 7 only at the side plate 52 that is the other side portion of the outer link 5 in an axial direction of the central shaft J2. The side plate 51 is not biased by the torsion coil spring 7. Therefore, the outer link 5 is also maintained at a certain attitude and do not swinglingly rattle. Thus, generation of noise at a time when the door is rotated to be opened or closed can be prevented.

Figure 17:
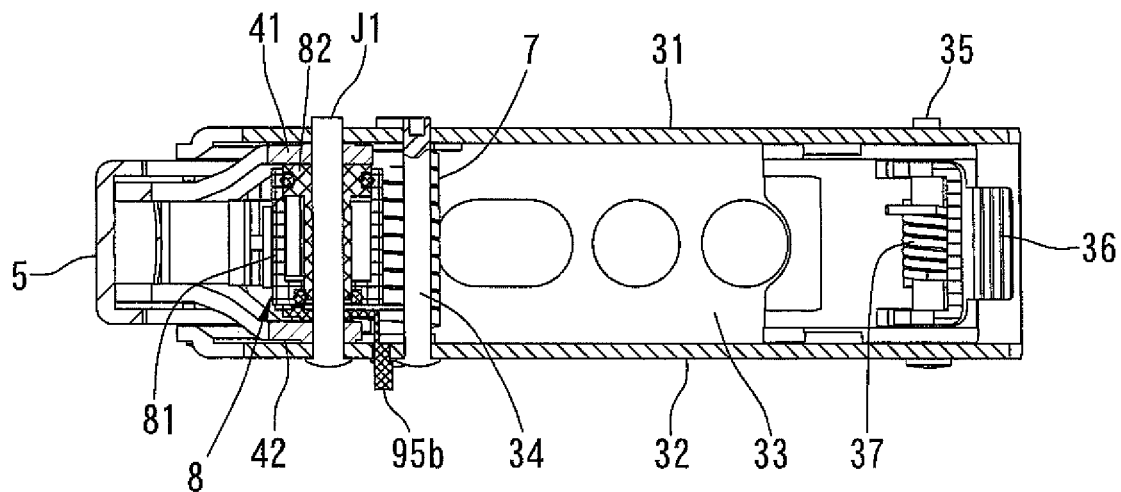
FIG. 17 is a cross-sectional view taken along line A-A of FIG. 2.
Figure 18:
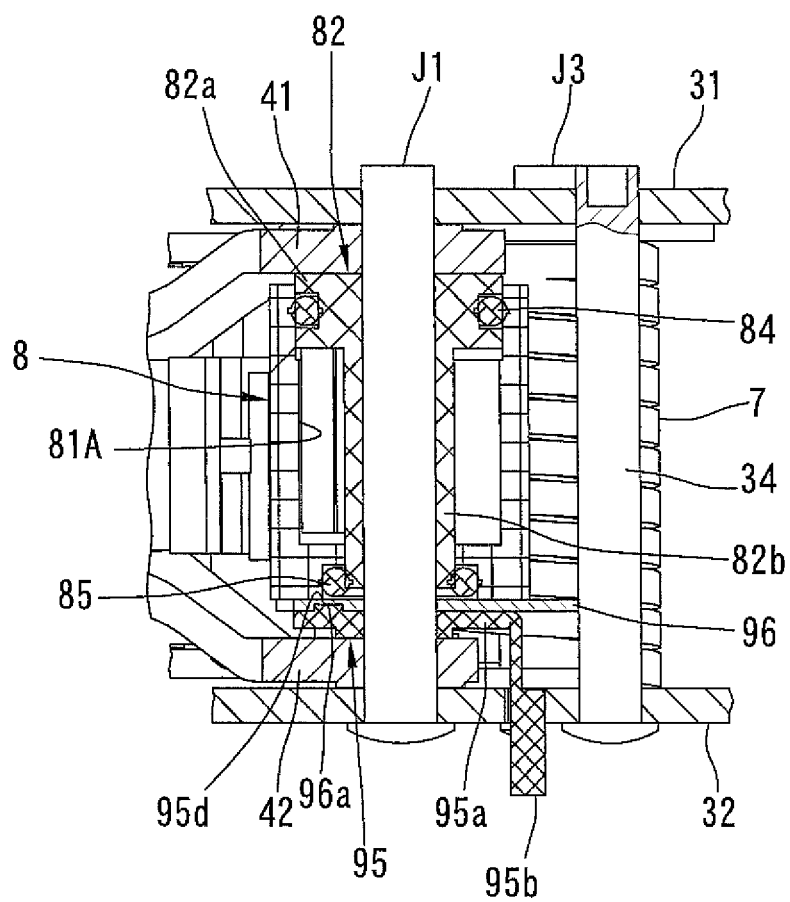
FIG. 18 is an enlarged view of a main portion of FIG. 17.

As shown in FIGS. 17 and 18, the rotary damper 8 is disposed between the side plates 41, 42 of the inner link 4. The rotary damper 8 is disposed for controlling the rotation speeds of the inner link 4 and the outer link 5 to be at low speeds, thereby controlling the rotation speeds of the door and the cupped member 6 to be at low speeds, when the door and the cupped member 6 are rotated in the closing direction. As shown in FIG. 7 and FIGS. 17 to 28, the rotary damper 8 includes a damper body 81 and a rotor 82.

As shown in FIGS. 24 to 28, the damper body 81 has a configuration of bottomed circular cylinder whose one end is open and the other end portion is closed by a bottom 81a. An inner portion of the damper body 81 is a receiving portion 81A. The damper body 81 is disposed between the side plates 41, 42 such that the open portion of the damper body 81 is opposed to the side plate 41 of the inner link 4. Moreover, the damper body 81 is coaxially aligned with the central shaft J1. A through hole 81b is formed in a central portion of the bottom 81a. The through hole 81b is coaxially aligned with the central shaft J1.

The rotor 82 includes a large-diameter portion 82a and a small-diameter portion 82b that are coaxially formed. The large-diameter portion 82a is rotatably fitted in an end portion of an inner circumferential surface of the damper body 81 on the opening side. The small-diameter portion 82b is rotatably fitted in the through hole 81b. By this arrangement, the damper body 81 and the rotor 82 are rotatable with respect to each other about axes thereof (axis of the central shaft J1).

A support hole 82d is formed in a central portion of the rotor 82 such that the support hole 82d extends through the rotor 82 form one end surface of the rotor 82 to the other end surface of the rotor 82 along the axis of the rotor 82. The central shaft J1 is rotatably disposed through the support hole 82d. Thereby, the rotor 82 is rotatably supported by the hinge body 3 via the central shaft J1, thereby the rotary damper 8 being rotatably supported by the hinge body 3. Alternatively, the rotary damper 8 may be rotatably supported by the central shaft J2. In this case, the rotary damper 8 may be disposed between the side plates 51, 52 of the outer link 5. Alternatively, the rotary damper 8 may be rotatably supported by another shaft that are parallel to the central shafts J1, J2. In this case, the rotary damper 8 may be disposed outside of the inner link 4 and the outer link 5.

As shown in FIGS. 7, 8 and FIGS. 19 to 23, two teeth (external gear portions) 81c, 81d are formed in an outer circumferential surface of the damper body 81 such that the teeth 81c, 81d are spaced from each other in a circumferential direction. The two teeth 81c, 81d constitute parts of a gear disposed about the axis of the damper body 81.

As shown in FIGS. 7 to 10, the central shaft J2 is rotatably disposed through a gear member 93. The gear member 93 is disposed between the side plates 51, 51 of the outer link 5 and the gear member 93 is non-rotatably connected to the outer link 5. Accordingly, the gear member 93 is rotated together with the outer link 5 about the central shaft J2.

A tooth 93a is formed in the gear member 93. The tooth 93a is engageable with the teeth 81c, 81d formed in the damper body 81. As shown in FIG. 10, when the cupped member 6 is positioned in an engageable range between the closed position and an engagement start position spaced from the closed position toward the open position by a predetermined angle, the tooth 93a is positioned in between the teeth 81c, 81d. Therefore, when the cupped member 6 is positioned in the engageable range, the tooth 93a is engaged with the teeth 81c, 81d and causes the damper body 81 to be rotated accompanying the rotation of the outer link 5. To be more specific, when the cupped member 6 is rotated in the opening direction, the tooth 93a is engaged with the tooth 81c and causes the damper body 81 to be rotated in a counter-clockwise direction in FIG. 10. When the cupped member 6 is rotated in the closing direction, the tooth 93a is engaged with the tooth 81d and causes the damper body 81 to be rotated in a clockwise direction in FIG. 10. As is clear from this, the gear member 93 and the teeth 81c, 81d engageable with the tooth 93a of the gear member 93 constitute a second rotation transmission mechanism that transmits the rotation of the outer link 5 to the damper body 81. When the rotary damper 8 is mounted around the central shaft J2, the gear member 93 is mounted around the central shaft J1 and rotated together with the inner link 4.

When the cupped member 6 is positioned between the engagement start position and the open position, i.e. outside of the engageable range, the tooth 93a of the gear member 93 is positioned outside of between the teeth 81c, 81d and do not engage with the teeth 81c, 81d. Therefore, in this condition, the damper body 81 can be freely rotated with respect to the gear member 93, and thereby, with respect to the outer link 5. However, even in this condition, the damper body 81 is not freely rotated alone, but the damper body 81 is rotated together with the rotor 82, as will be described later.

Figure 19:
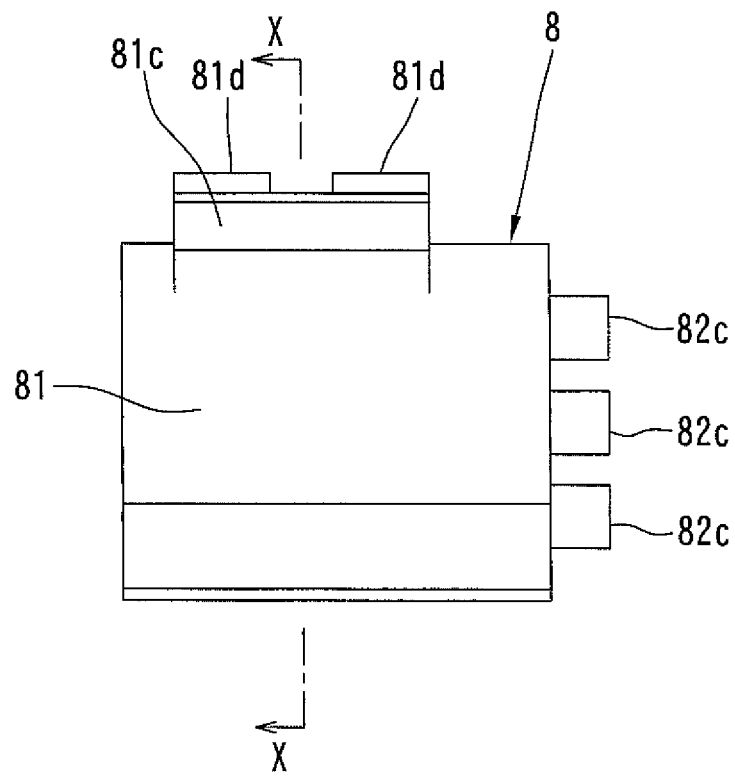
FIG. 19 is a side view of a rotary damper used in the first embodiment.
Figure 20:
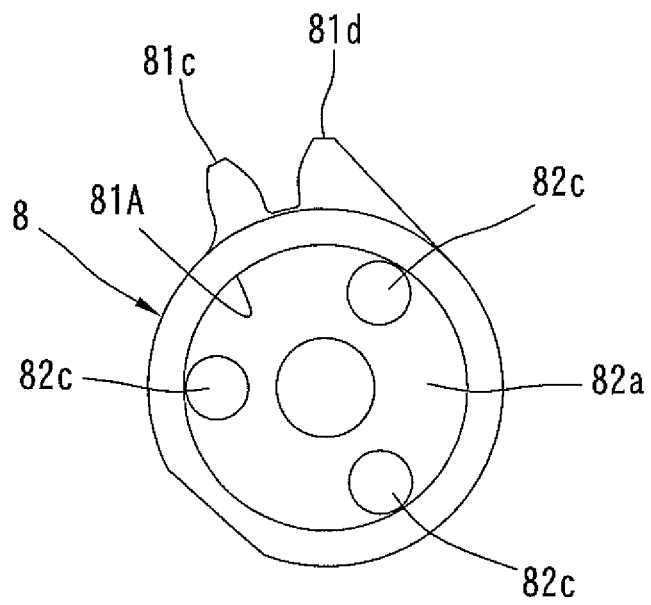
FIG. 20 is a right side view of the rotary damper.
Figure 21:
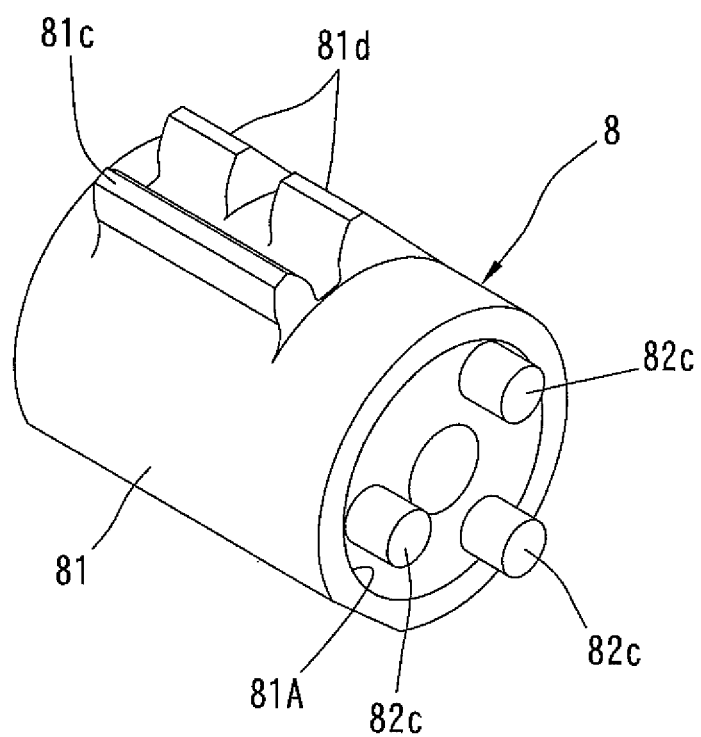
FIG. 21 is a perspective view of the rotary damper.

As shown in FIGS. 19 to 21, a plurality of (three in this embodiment) protrusions 82c are formed in an end surface of the large-diameter portion 82a of the rotor 82 opposed to the side plate 41. The plurality of protrusions 82c are disposed on a circle about an axis of the rotor 82. The protrusions 82c may be disposed on circles having different diameters. Only one protrusion 82c may be formed.

As shown in FIG. 7, holes 41b of the same number as the protrusions 82c are formed in a portion of the side plate 41 of the inner link 4 opposed to the large-diameter portion 82a. The protrusions 82c are respectively disposed in the holes 41b. By this arrangement, the rotor 82 is rotated together with the inner link 4. Accordingly, when the cupped member 6 is rotated in the closing direction, the rotor 82 is rotated in a counter-clockwise direction in FIGS. 22 and 23, and when the cupped member 6 is rotated in the opening direction, the rotor 82 is rotated in a clockwise direction in FIGS. 22 and 23. As is clear from this, the holes 41b and the protrusions 82c constitute a catch mechanism (first rotation transmission mechanism) that causes the rotor 82 to be rotated about the central shaft J1 together with the one end portion of the inner link 4.

When the cupped member 6 is positioned in the engageable range, a direction of rotation of the one end portion of the inner link 4 about the central shaft J1 and a direction of rotation of the one end portion of the outer link 5 about the central shaft J2 are the same. However, since the rotation of the outer link 5 is transmitted to the damper body 81 via the gear member 93, a direction of rotation of the damper body 81 and a direction of rotation of the rotor 82 are opposite from each other. Accordingly, relative rotation speeds of the damper body 81 and the rotor 82 with respect to each other are faster than when, for example, one of the damper body 81 and the rotor 82 is non-rotatably disposed in the hinge body 3 and only the other of them is rotated.

The rotation transmission mechanism between the damper body 81 and the outer link 5 and the rotation transmission mechanism between the rotor 82 and the inner link 4 are not limited to the embodiment mentioned above and various modifications can be made. For example, a protrusion corresponding to the protrusion 82c may be formed in an outer end surface of the bottom 81a of the damper body 81, i.e., an end surface of the bottom 81a that is opposed to the side plate 42, and a hole corresponding to the hole 41b may be formed in the side plate 42. And by disposing the protrusion in the hole, the damper body 81 may be made to be rotated together with the inner link 4. In this case, teeth corresponding to the teeth 81c, 81d may be formed in an outer circumferential surface of a portion of the rotor 82 that is protruded outside from the damper body 81, and the tooth 93a of the gear member 93 may be engaged with these teeth. Such a modification can also be applied when the rotary damper 8 is disposed around the central shaft J2.

As mentioned above, the large-diameter portion 82a of the rotor 82 is fitted in the end portion of the inner circumferential surface of the damper body 81 on the opening side and the small-diameter portion 82b is fitted in the through hole 81b of the bottom 81a. Accordingly, as shown in FIG. 18, an annular space 83 having opposite end portions thereof closed by the bottom 81a of the damper body 81 and the large-diameter portion 82a of the rotor 82 is formed between the inner circumferential surface of the damper body 81 and an outer circumferential surface of the small-diameter portion 82b. The space 83 is sealed from the outside by a gap between the inner circumferential surface of the damper body 81 and an outer circumferential surface of the large-diameter portion 82a being sealed by a seal member 84 such as an O-ring and a gap between an inner circumferential surface of the through hole 81b and the outer circumferential surface of the small-diameter portion 82h being sealed by a seal member 85 such as an O-ring. The space 83 is filled with fluid. The fluid may be selected from various kinds of fluid used in the conventional rotary dampers such as viscous fluid.

The large-diameter portion 82a and the small-diameter portion 82b of the rotor 82 are respectively fitted in the inner circumferential surface of the damper body 81 and the inner circumferential surface of the through hole 81b such that the large-diameter portion 82a and the small-diameter portion 82b are movable in the axial direction of the damper body 81. Accordingly, the damper body 81 and the rotor 82 are movable in the axial direction of the damper body 81 and the rotor 82 with respect to each other. In this embodiment, the rotor 82 is fixed in position and the damper body 81 is movable with respect to the rotor 82. It is to be understood that the damper body 81 may be fixed in position and the rotor 82 may be movable with respect to the damper body 81 or, alternatively, both of the damper body 81 and the rotor 82 may be movable with respect to each other. The damper body 81 is movable between a first position shown in FIGS. 24, 25 and 27 and a second position shown in FIGS. 26 and 28. A distance between the first position and the second position (to be referred to as "spaced distance" hereinafter) is small, in the order of 0.1 to 0.2 mm, for example.

Figure 22:
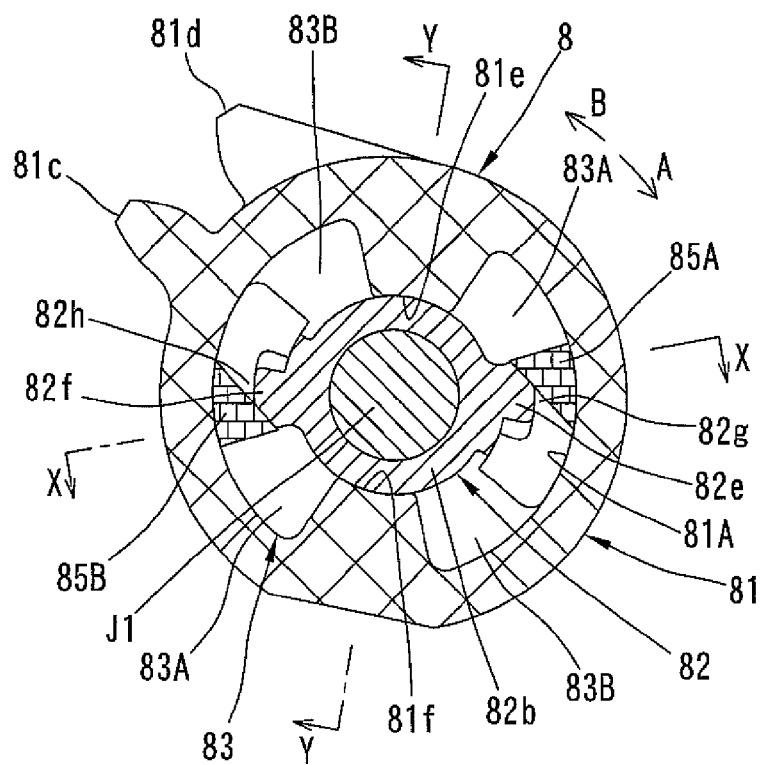
FIG. 22 is a cross-sectional view taken along line X-X of FIG. 19, showing the rotary damper rotated in a closing direction.
Figure 23:
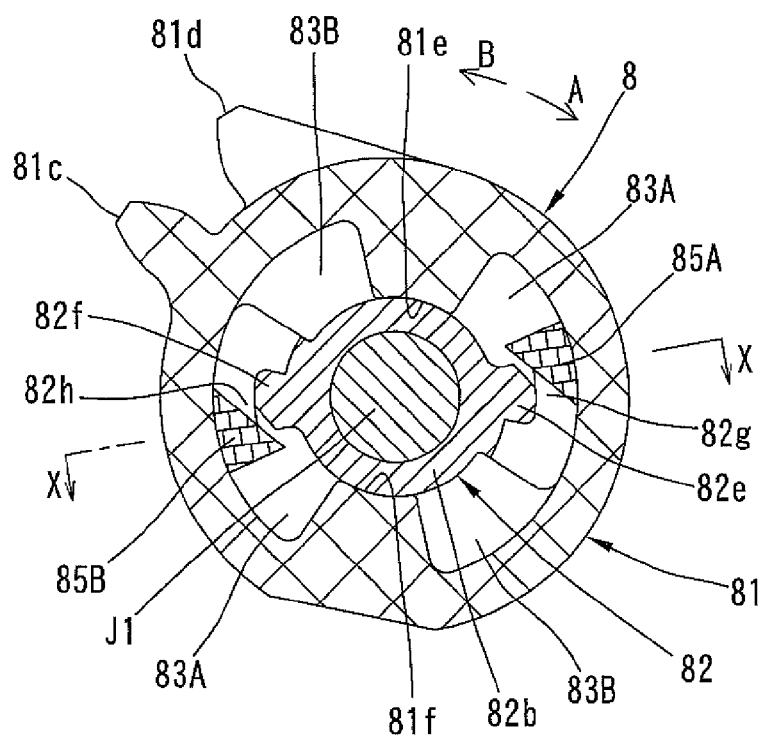
FIG. 23 is a cross-sectional view similar to FIG. 22, showing the rotary damper rotated in an opening direction.
Figure 27:
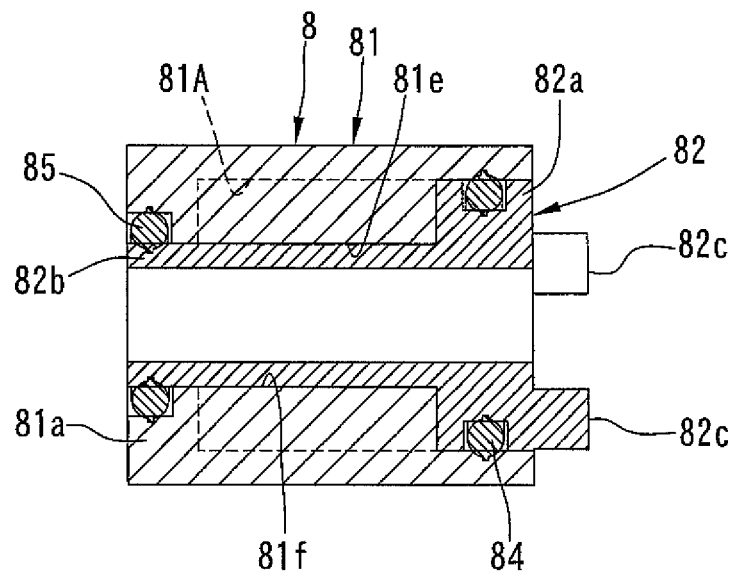
FIG. 27 is a cross-sectional view taken along line Y-Y of FIG. 22, showing the damper body in the first position.
Figure 28:
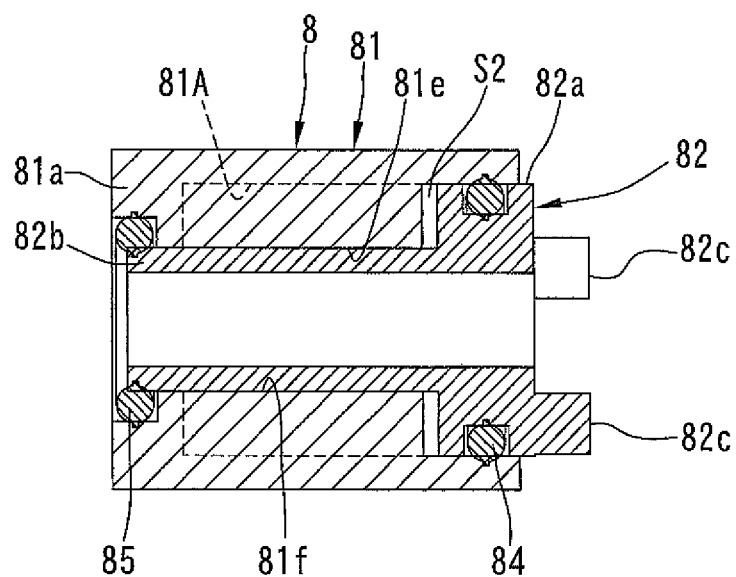
FIG. 28 is a cross-sectional view taken along line Y-Y of FIG. 22, showing the damper body in the second position.

As shown in FIGS. 22 and 23, a pair of partition wall portions 81e, 81f are formed in a portion of the inner circumferential surface of the damper body 81 facing the space 83. The partition wall portions 81e, 81f are disposed away from each other by 180 degrees in the circumferential direction of the damper body 81. The partition wall portions 81e, 81f extend in an axial direction of the damper body 81. One end portions of the partition wall portions 81e, 81f are integrally formed in the bottom 81a. Specifically, the partition wall portions 81e, 81f extend from the bottom 81a toward the opening. As shown in FIG. 27, a length of the partition wall portions 81e, 81f is equal to a distance between the bottom 81a and the large-diameter portion 82a when the damper body 81 is in the first position. Accordingly, when the damper body 81 is in the first position, end surfaces of the partition wall portions 81e, 81f on the opening side (inner surface of the receiving portion 81A opposed to the end surface (outer surface) of the large-diameter portion 82a of the rotor 82 in a direction of rotation axis; to be referred to as "distal end surfaces" hereinafter) are in contact with the large-diameter portion 82a. However, when the damper body 81 is in the second position, as shown in FIG. 28, the distal end surfaces of the partition wall portions 81e, 81f are spaced form the large-diameter portion 82a by a distance equal to the spaced distance.

Figure 24:
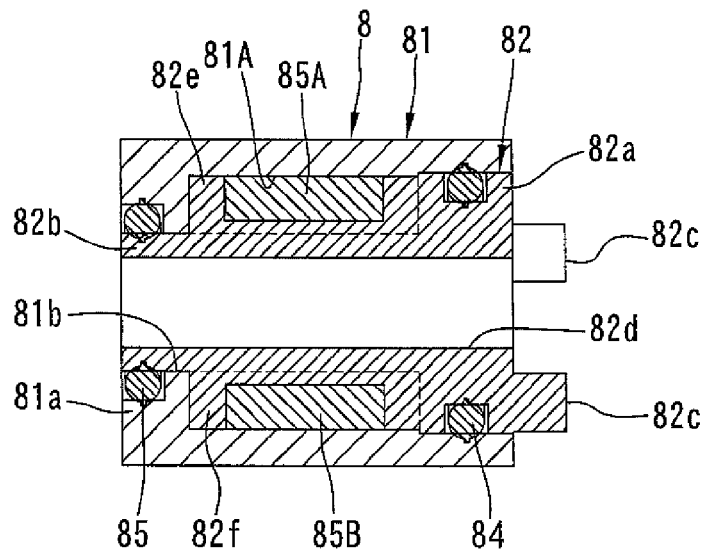
FIG. 24 is a cross-sectional view taken along line X-X of FIG. 22, showing a damper body in a first position.
Figure 25:
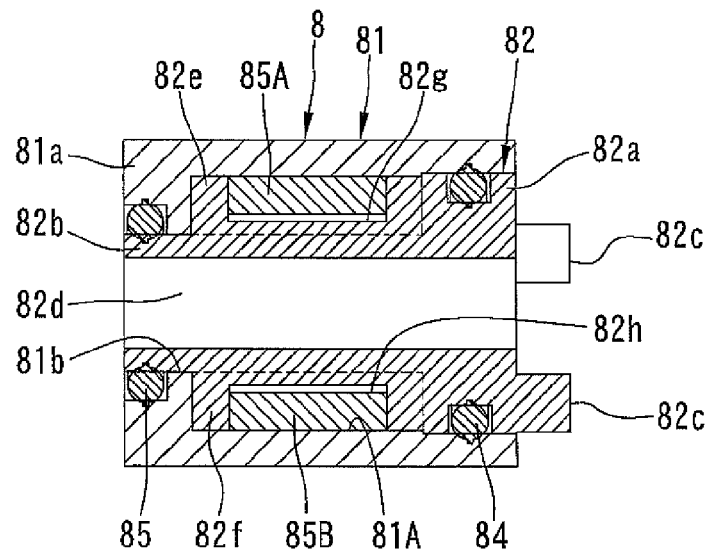
FIG. 25 is a cross-sectional view taken along line X-X of FIG. 23, showing the damper body in the first position.
Figure 26:
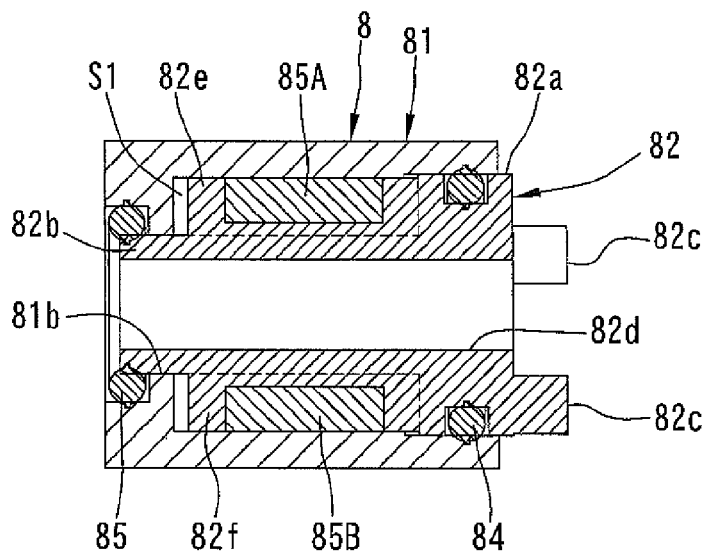
FIG. 26 is a cross-sectional view taken along line X-X of FIG. 22, showing the damper body in a second position.

As shown in FIGS. 22 to 26, a pair of protrusions 82e, 82f are formed in a portion of the small-diameter portion 82b of the rotor 82 facing the space 83. The protrusions 82e, 82f are disposed away from each other by 180 degrees in a circumferential direction of the rotor 82 (the circumferential direction of the damper body 81). Moreover, the protrusions 82e, 82f are arranged so as to be respectively disposed in spaces between the partition wall portions 81e, 81f. The protrusions 82e, 82f extend in the axial direction of the rotor 82 (the axial direction of the damper body 81). One end portions of the protrusions 82e, 82f are integrally formed in the large-diameter portion 82a. Specifically, the protrusions 82e, 82f extend from the large-diameter portion 82a toward the bottom 81a. A length of the protrusions 82e, 82f is equal to the length of the partition wall portions 81e, 81f. Accordingly, as shown in FIGS. 24 and 25, when the damper body 81 is in the first position, end surfaces of the protrusions 82e, 82f on the bottom 81a side (outer surface opposed to a bottom surface (inner surface) of the bottom 81a of the receiving portion 81A in a direction of rotation axis; to be referred to as "distal end surfaces" hereinafter) are in contact with the bottom 81a. However, when the damper body 81 is in the second position, as shown in FIG. 26, the distal end surfaces of the protrusions 82e, 82f are spaced form the bottom 81a by a distance equal to the spaced distance.

As shown in FIGS. 22, 24, 27 and 28, inner end surfaces of the partition wall portions 81e, 81f, i.e., end surfaces of the partition wall portions 81e, 81f that are located inside in a radial direction of the damper body 81, are rotatably contacted with the outer circumferential surface of the small-diameter portion 82b. As shown in FIGS. 24 to 26, outer end surfaces of the protrusions 82e, 82f, i.e., end surfaces of the protrusions 82e, 82f that are located outermost in a radial direction of the rotor 82, are rotatably contacted with the inner circumferential surface of the damper body 81. As a result, the space 83 is divided into four spaces arranged in the circumferential direction by the partition wall portions 81e, 81f and the protrusions 82e, 82f. Of the four spaces, the space divided by the partition wall portion 81e and the protrusion 82e and the space divided by the partition wall portion 81f and the protrusion 82f are referred to as high pressure chambers (pressure chambers) 83A and the space divided by the partition wall portion 81e and the protrusion 82f and the space divided by the partition wall portion 81f and the protrusion 82e are referred to as low pressure chambers (pressure chambers) 83B.

As shown in FIGS. 22 to 26, recesses 82g, 82h are respectively formed in the protrusions 82e, 82f. As shown in FIGS. 22 and 23, one of the high pressure chambers 83A and one of the low pressure chambers 83B are communicated with each other via the recess 82g and the other of the high pressure chambers 83A and the other of the low pressure chambers 83B are communicated with each other via the recess 82h. The recesses 82g, 82h are respectively opened and closed by valves 85A, 85B.

Specifically, as shown in FIGS. 22 and 23, outer portions of the valves 85A, 85B in the radial direction of the damper body 81 are slidably and sealingly contacted with the inner circumferential surface of the damper body 81 facing the space 83 with a predetermined pressing force. Inner portions of the valves 85A, 85B are respectively provided with the protrusions 82e, 82f of the rotor 82 such that the protrusions 82e, 82f are movable in the circumferential direction in predetermined ranges. As shown in FIGS. 22 and 24, when the cupped member 6 is rotated in the closing direction and the damper body 81 is rotated in a direction of arrow A and the rotor 82 is rotated in a direction of arrow B accompanying the rotation of the cupped member 6, the recesses 82g, 82h are respectively closed by the valves 85A, 85B. As a result, the fluid in the high pressure chamber 83A cannot pass through the recesses 82g, 82h, and therefore, flows into the low pressure chamber 83B via a slight gap S1 between the bottom 81a and the distal end surfaces of the recesses 82g, 82h (see FIG. 26) and a slight gap S2 between the large-diameter portion 82a and the distal end surfaces of the partition wall portions 81e, 81f (see FIG. 28). At this time, the gap S1 between the bottom 81a and the distal end surfaces of the recesses 82g, 82h and the gap S2 between the large-diameter portion 82a and the distal end surfaces of the partition wall portions 81e, 81f act as kinds of orifices that resist against the flow of the fluid. Accordingly, the rotation speed of the damper body 81 in the direction of arrow A and the rotation speed of the rotor 82 in the direction of arrow B are controlled to be at low speeds, thereby the rotation speed of the cupped member 6 in the closing direction being controlled to be at a low speed.

When the cupped member 6 is rotated in the closing direction outside of the engageable range, the damper body 81 is not rotated accompanying the rotation of the outer link 5. Instead, the damper body 81 is rotated together with the rotor 82 due to a frictional resistance between the partition wall portions 81e, 81f and the small-diameter portion 82b, a frictional resistance between the protrusions 82e, 82f and the inner circumferential surface of the damper body 81 and a frictional resistance between the valves 85A, 85B and the inner circumferential surface of the damper body 81. Therefore, the rotary damper 81 does not function as a damper during such time.

When the cupped member 6 is rotated in the opening direction, the damper body 81 is rotated in the direction of arrow B in FIGS. 22 and 23, and the rotor 82 is rotated in the direction of arrow A. During such time, as shown in FIGS. 23 and 25, the valves 85A, 85B do not close entireties of the recesses 82g, 82h, leaving portions of the recesses 82g, 82h open. This allows the fluid in the low pressure chambers 83B, 83B to respectively flow into the high pressure chambers 83A, 83A via the portions of the recesses 82g, 82h that are left open. Here, the portions of the recesses 82g, 82h that are left open have enough flow areas to allow the fluid in the low pressure chambers 83B, 83B to respectively flow into the high pressure chambers 83A, 83A substantially without resistance. Therefore, the damper body 81 and the rotor 82 can be rotated substantially without resistance and the cupped member 6 can be rotated in the opening direction at a high speed.

A rotary damper used in the hinge device of the present invention is not limited to the rotary damper 8 having the features described above. Any rotary damper having other features known in the art may be used as long as the rotary damper can control rotation speeds of the inner link 4 and/or the outer link 5 to be at low speeds. However, it is required that such rotary damper should have at least one of the gaps S1, S2.

A strength of a damping effect of the rotary damper 8, i.e., a strength of a damping effect of the rotary damper 8 to control the rotation speeds of the damper body 81 and the rotor 82 to be at low speeds when the cupped member 6 is rotated in the closing direction within the engageable range, can be adjusted by adjusting the position of the damper body 81 with respect to the rotor 82 at an appropriate position between the first position and the second position. In order to achieve this, a position adjustment mechanism having the following features is provided between the side plate 42 of the inner link 4 and the bottom 81a of the damper body 81.

Specifically, as shown in FIG. 7 and FIGS. 14 to 18, a rotatable cam plate (cam member) 95 and a movable cam plate (second cam member) 96 are disposed between the side plate (fixed member) 42 of the inner link 4 and the bottom 81a of the damper body 81. The rotatable cam plate 95 is disposed on the side plate 42 side and the movable cam plate 96 is disposed on the damper body 81 side.

As particularly shown in FIG. 18, the rotatable cam plate 95 is rotatably contacted with an inner surface of the side plate 42 opposed to the side plate 41. The central shaft J1 is rotatably disposed through the rotatable cam plate 95. An arm 95a is formed in an outer circumferential portion of the rotatable cam plate 95. The arm 95a extends outward in a radial direction of the central shaft J1. An operation tab 95b protruded toward the side plate 42 is formed in a distal end portion of the arm 95a. The operation tab 95b passes through the side plate 42 and further through an operation window 32a (see FIG. 2) formed in the side plate 32 of the hinge body 3 and is protruded outside. Accordingly, the operation tab 95b can be operated from outside the hinge device 1.

Figure 29:
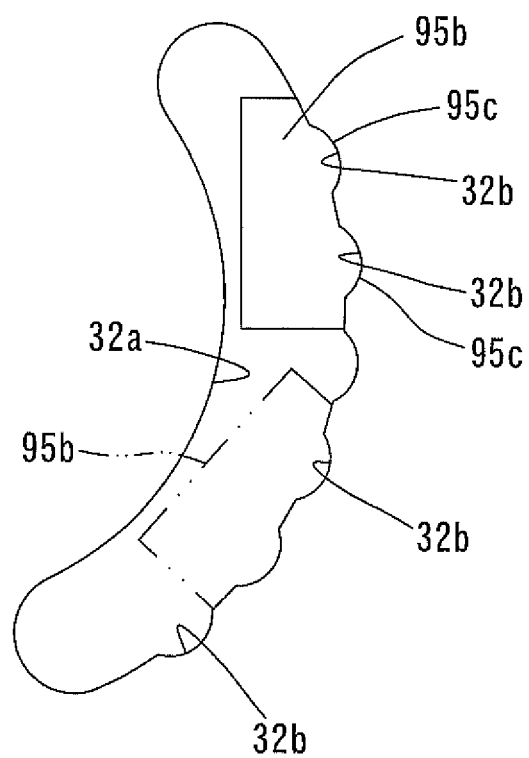
FIG. 29 is an enlarged view of a main portion of FIG. 2.
Figure 30:
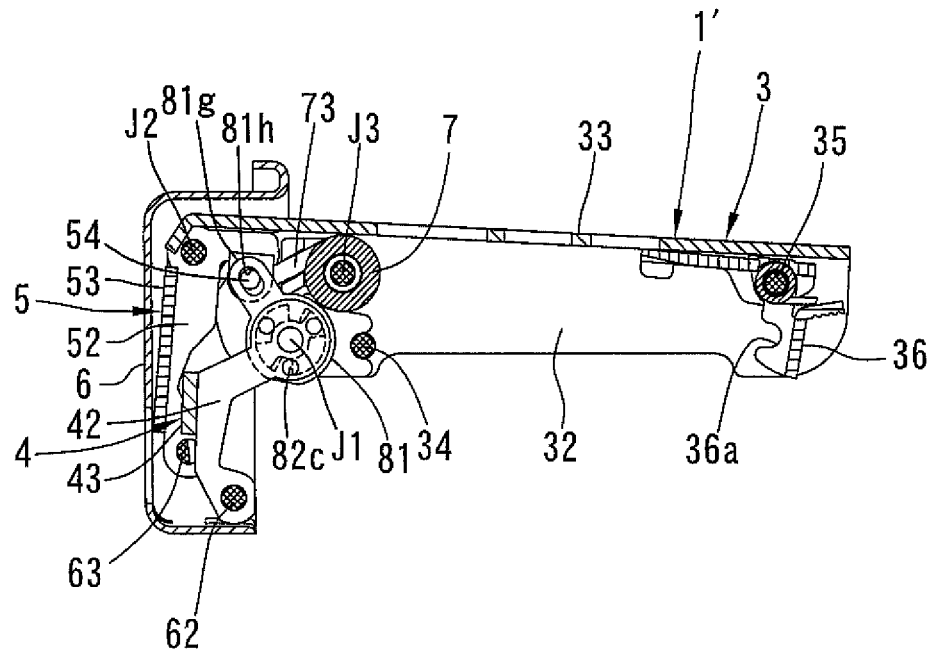
FIG. 30 is a cross-sectional view of a hinge device with damper according to a second embodiment of the present invention similar to FIG. 8, showing the door-side mounting member in the closed position.
Figure 31:
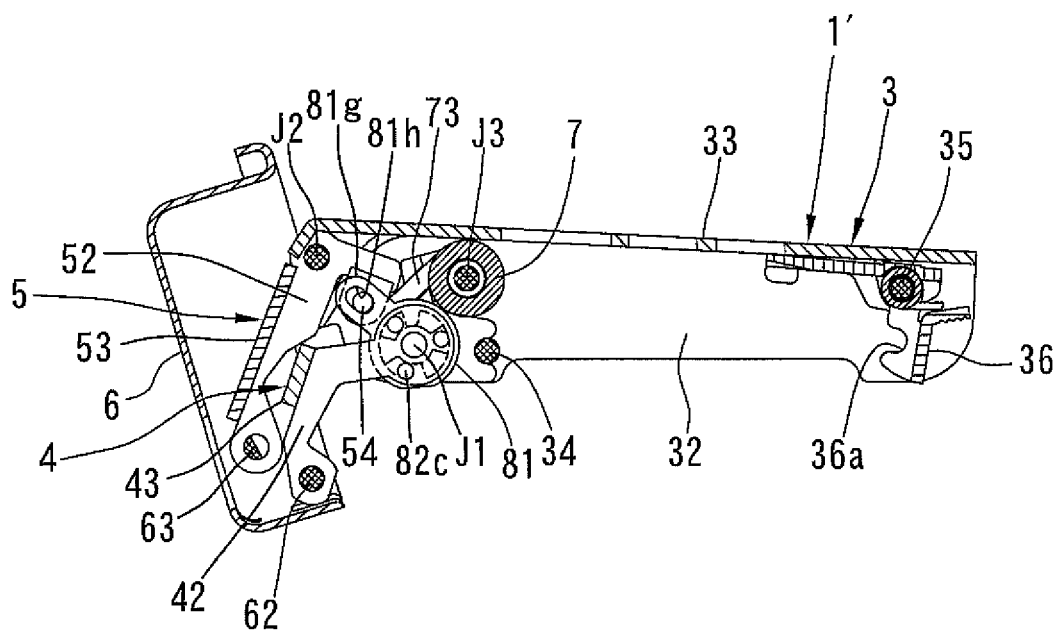
FIG. 31 is a cross-sectional view of the second embodiment similar to FIG. 8, showing the door-side mounting member in a predetermined first intermediate position.
Figure 32:
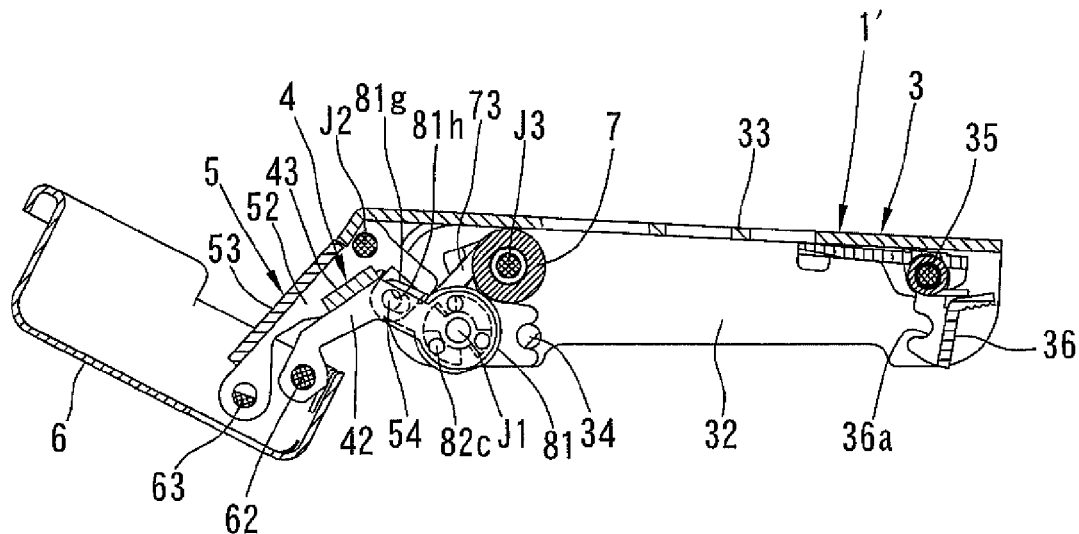
FIG. 32 is a cross-sectional view of the second embodiment similar to FIG. 8, showing the door-side mounting member in a predetermined second intermediate position.
Figure 33:
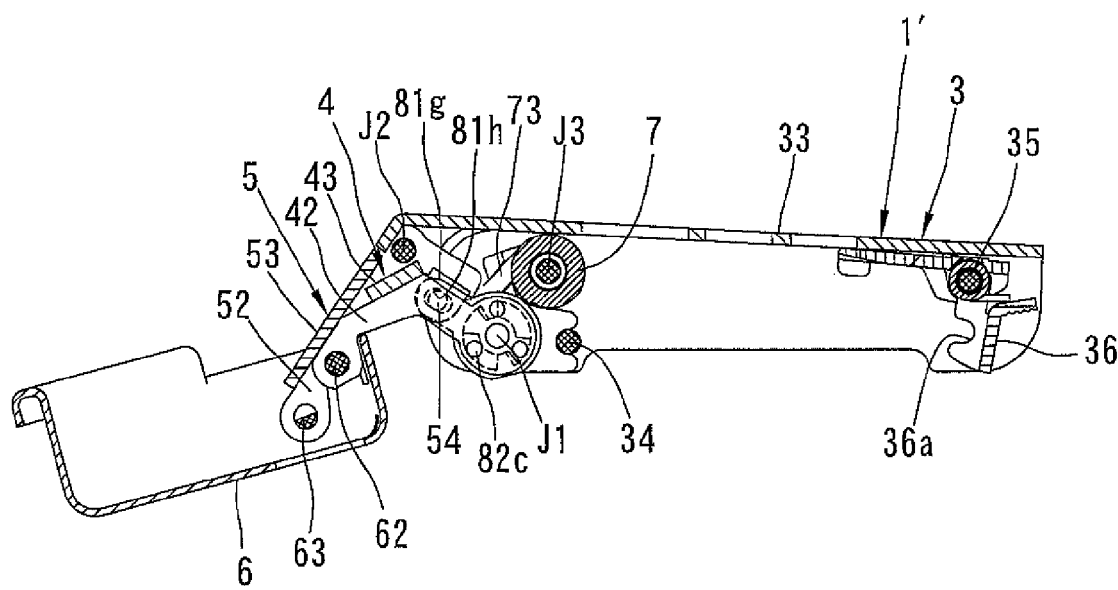
FIG. 33 is a cross-sectional view of the second embodiment similar to FIG. 8, showing the door-side mounting member in an open position.

As shown in FIG. 29, the operation window 32a is formed as an elongated hole extending in a circular-arc configuration about the central shaft J1. Accordingly, the rotatable cam plate 95 can be rotated by moving the operation tab 95b along the operation window 32a.

By an elasticity of the arm 95a, the operation tab 95b is pressingly contacted with a portion of an inner circumferential surface of the operation window 32a on the large-diameter portion side. A plurality of engagement recesses 32b are formed in the inner circumferential surface of the operation window 32a on the large-diameter portion side. Engagement projections 95c disengageably engaged with the engagement recesses 32b are formed in an outer surface of the operation tab 95b contacted with the inner circumferential surface of the operation window 32a. The engagement projections 95c are engaged with the engagement recesses 32b by an elastic force of the arm 95a, thereby the operation tab 95b being positioned with a force of a predetermined magnitude, thereby the rotational position of the rotatable cam plate 95 being determined. It is to be understood that the engagement projections 95c can be disengaged from the engagement recesses 32b by moving the operation tab 95b in the operation window 32a toward the small-diameter portion against the elastic force of the arm 95a. And the rotatable cam plate 95 can be rotated by moving the operation tab 95b in a longitudinal direction of the operation window 32a while keeping the engagement projections 95c and the engagement recesses 32b disengaged from each other. After that, when the operation tab 95b is made to be freely movable, the operation tab 95b is pressed against the inner circumferential surface of the operation window 32a on the large-diameter portion side by the elastic force of the arm 95a and the engagement projections 95c are engaged with the engagement recesses 32b. Thereby, the rotatable cam plate 95 is maintained at the rotational position.

As shown in FIG. 18, one surface of the movable cam plate 96 is opposed to the rotatable cam plate 95 and the other surface of the movable cam plate 96 is rotatably contacted with the bottom 81a of the damper body 81. The central shaft J1 is rotatably disposed through the movable cam plate 96. The movable cam plate 96 is engaged with the engagement shaft 34, thereby prohibited from being rotated about the central shaft J1. The movable cam plate 96 is movable with respect to the central shaft J1 and the engagement shaft 34 in the longitudinal directions thereof. Accordingly, the movable cam plate 96 is movable toward and away from the rotatable cam plate 95.

As shown in FIG. 7, a plurality of cam surfaces (cam portions) 95d extending in a circumferential direction are formed in a surface of the rotatable cam plate 95 opposed to the movable cam plate 96. A plurality of cam surfaces (abutment portions) 96a are formed in a surface of the movable cam plate 96 opposed to the rotatable cam plate 95. The number of the cam surfaces 96a is equal to the number of the cam surfaces 95d. The cam surfaces 95d and the cam surfaces 96a are respectively contacted with each other. The rotatable cam plate 95 and the movable cam plate 96 are not contacted with each other except for at the cam surfaces 95d and the cam surfaces 96a.

When the rotatable cam plate 95 is rotated in one direction, the cam surfaces 95d, 96a contacted with each other moves the movable cam plate 96 away from the rotatable cam plate 95 and moves the damper body 81 from the second position side toward the first position. This causes the gap S1 between the bottom 81a and the protrusions 82e, 82f and the gap S2 between the large-diameter portion 82a and the partition wall portions 81e, 81f to be narrowed, thereby causing a resistance of the fluid flowing through the gaps S1, S2 to be increased. Therefore, the damping effect of the rotary damper 8 is increased.

To the contrary, when the rotatable cam plate 95 is rotated in the other direction, the cam surfaces 95d, 96a allow the movable cam plate 96 to be moved toward the rotatable cam plate 95. This causes the movable cam plate 96 to be moved from the first position side toward the second position because of a pressure of the fluid in the space 83 of the damper body 81. As a result, the gap S1 between the bottom 81a and the protrusions 82e, 82f and the gap S2 between the large-diameter portion 82a and the partition wall portions 81e, 81f are widened, thereby causing the resistance of the fluid flowing through the gaps S1, S2 to be reduced. Therefore, the damping effect of the rotary damper 8 is reduced.

As is clear from the above, the rotatable cam plate 95, the movable cam plate 96 and the fluid filled in the space 83 constitute a position adjustment mechanism that adjusts the position of the damper body 81 with respect to the rotor 82. The position adjustment mechanism is not limited to this, but various modifications can be adopted. For example, a positive cam mechanism may be provided between the rotatable cam plate 95 and the movable cam plate 96 so that the movable cam plate 96 can be moved toward and away from the rotatable cam plate 95 by the rotation of the rotatable cam plate 95. In this case, the fluid in the space 83 is not required for moving the movable cam plate 96. Moreover, in place of the cam surface 96a, a protrusion (abutment portion) that can be abutted against the cam surface 95d may be formed.

The rotary damper 8, the rotatable cam plate 95 and the movable cam plate 96 can be built in the hinge body 3 in the following manner. Firstly, the side plates 41, 42 of the inner link 4 are inserted between the side plates 31, 32 of the hinge body 3. Secondly, the rotary damper 8 is inserted between the side plates 41, 42. Then the rotary damper 8 is moved from the side plate 42 side toward the side plate 41 and the protrusions 82c are inserted into the holes 41b. Next, the rotatable cam plate 95 is inserted between the damper body 81 of the rotary damper 8 and the side plate 42 and the operation tab 95b of the rotatable cam plate 95 is inserted into the operation window 32a. Then the movable cam plate 96 is inserted between the rotatable cam plate 95 and the damper body 81. Finally, the central shaft J1 is inserted through the side plate 31, side plate 41, the support hole 82d, the movable cam plate 96, the rotatable cam plate 95, the side plate 42 and the side plate 32.

In the hinge device with damper 1 having the features mentioned above, when the cupped member 6 and the door are rotated in the closing direction, the rotation speed of the inner link 4 is controlled to be at a low speed by the rotary damper 8. At this time, if the operation tab 95b is rotationally operated to rotate the rotatable cam plate 95, the damper body 81 is moved with respect to the rotor 82 in a direction of rotation axis, causing dimensions of the gaps S1, S2 to be changed by widths corresponding to the distance the damper body 81 is moved. As a result, the resistance of the gaps S1, S2 against the fluid is changed, causing the damping effect of the rotary damper 8 to be changed. By this way, the rotation speed of the inner link 4 when being rotated at a low speed can be adjusted as appropriate.

FIGS. 30 to 33 show a second embodiment of the present invention. In a hinge device with damper 1' of the second embodiment, to transmit the rotation of the outer link 5 to the damper body 81, a second rotation transmission mechanism that is different from the one used in the first embodiment is adopted. Specifically, a protrusion 81g protruded outward in the radial direction of the damper body 81 is formed in the outer circumferential surface of the damper body 81. A guide hole (guide groove) 81h extending in a longitudinal direction of the protrusion 81g is formed in the protrusion 81g. In place of the guide hole 81h, a guide groove extending in the same direction may be formed in the protrusion 81g. A shaft portion 54 is formed in the one end portion of the outer link 5 with a longitudinal direction of the shaft portion 54 oriented in the axial direction of the central shaft J2. The shaft portion 54 is disposed at a location spaced from the axis of the central shaft J2. The shaft portion 54 is disposed in the guide hole 81h such that the shaft portion 54 is rotatable and movable in a longitudinal direction of the guide hole 81h. Accordingly, when the outer link 5 is rotated bout the central shaft J2, the damper body 81 is rotated about the central shaft J1. The guide hole

81h and the shaft portion 54 are arranged in a manner to enable the damper body 81 and the rotor 82 to be rotated in opposite directions. As long as the guide hole 81h can transmit the rotation of the outer link 5 to the damper body 81 in cooperation with the shaft portion 54, it is not required that the longitudinal direction of the guide hole 81h coincides with the longitudinal direction of the protrusion 81g, i.e., radial direction through a center of the damper body 81. Alternatively, the guide hole 81h may be oriented in a direction parallel to the radial direction of the damper body 81 or in a direction orthogonal to the radial direction of the damper body 81. Other features of the hinge device 1' are the same as those of the first embodiment. Therefore, same reference numerals are assigned to the same components and explanations about them are omitted.

A mode of transmission in which the rotation of the outer link 5 is transmitted to the damper body 81 by the guide hole 81h and the shaft portion 54 can be applied for the transmission of the rotation of the outer link 5 to the rotor 82. In this case, a protrusion corresponding to the protrusion 81g may be formed in a portion of the rotor 82 protruded outside from the damper body 81. To transmit the rotation of the inner link 4 to the damper body 81, a mechanism for rotation transmission by fitting of a protrusion and a hole may be provided between the damper body 81 and the side plate 42 of the inner link 4. When a rotary damper is disposed around another shaft other than the central shafts J1, J2, the rotation transmission mechanism by the guide hole 81h and the shaft portion 54 may be provided between the inner link 4 and one of the damper body 81 and the rotor 82 and between the outer link 5 and the other of the damper body 81 and the rotor 82.

Figure 34:
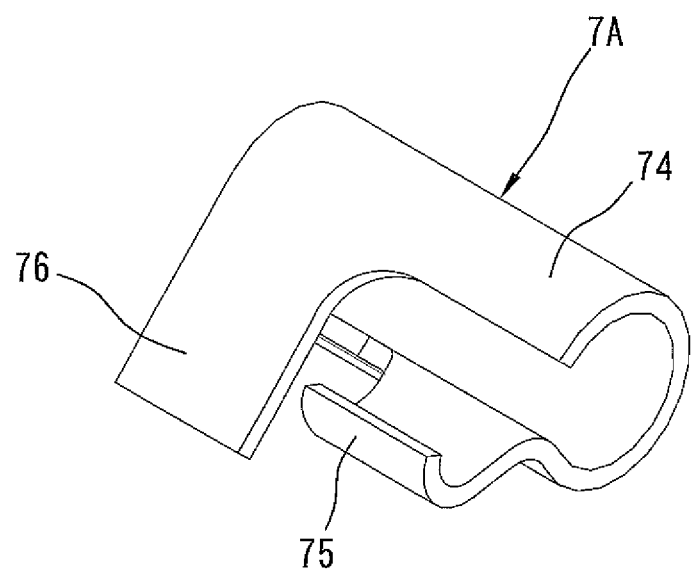
FIG. 34 is a perspective view of another example of a torsion coil spring used in the hinge device according to the present invention.
Figure 35:
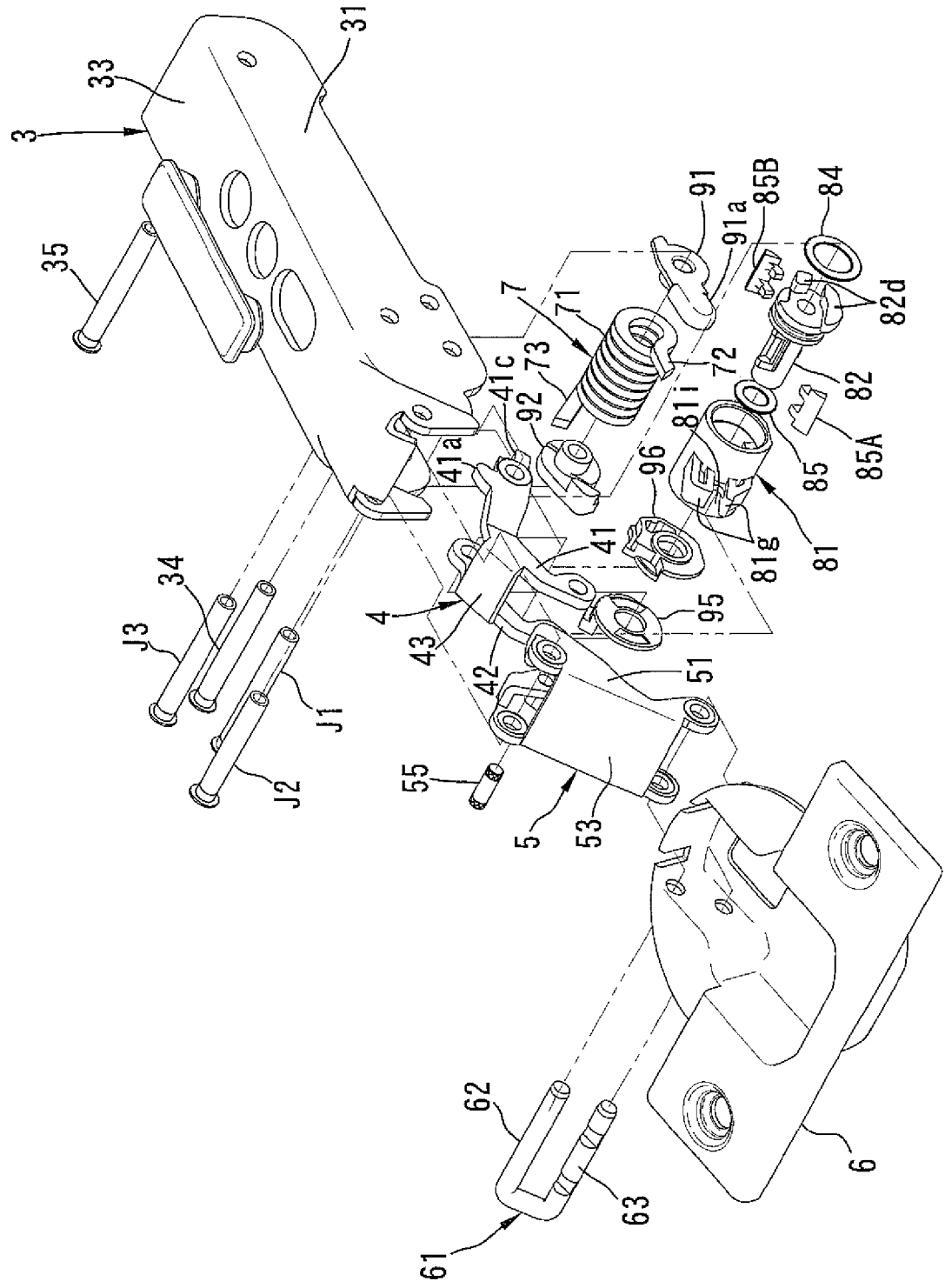
FIG. 35 is an exploded perspective view of a third embodiment of the present invention.
Figure 36:
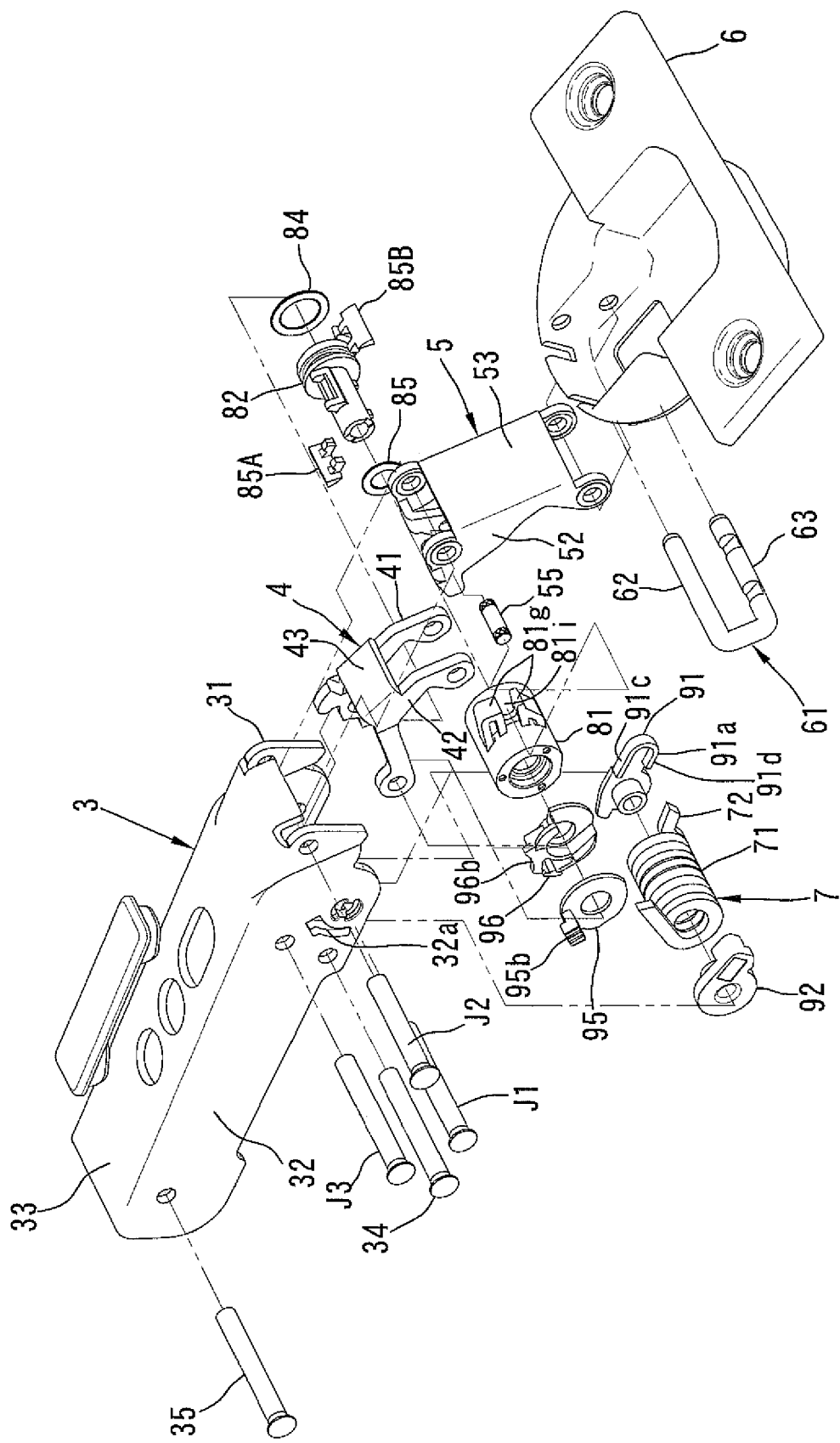
FIG. 36 is an exploded perspective view of the third embodiment, viewed from a different direction from FIG. 35.
Figure 37:
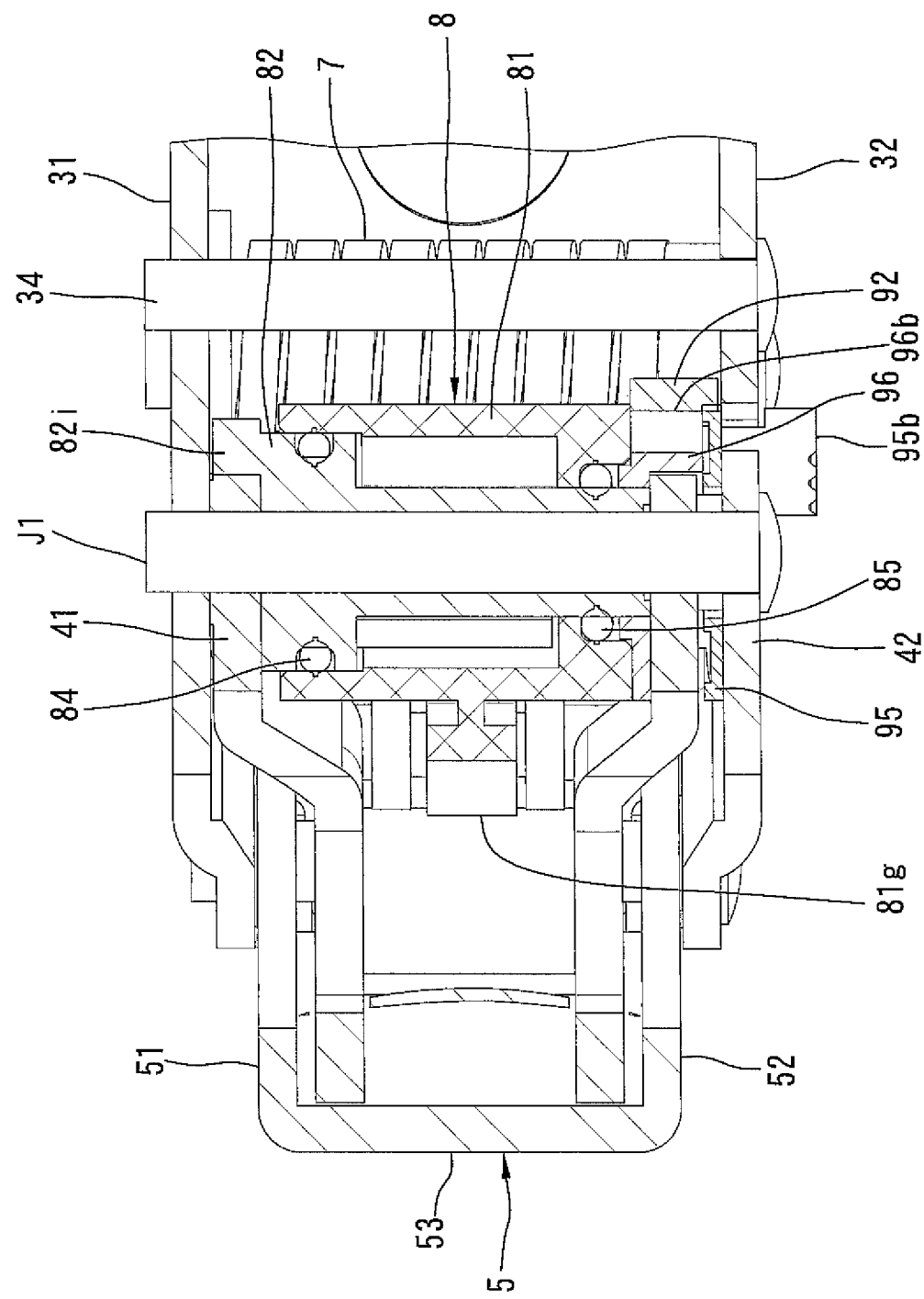
FIG. 37 is a cross-sectional view similar to FIG. 18, showing a main portion of the third embodiment.
Figure 38:
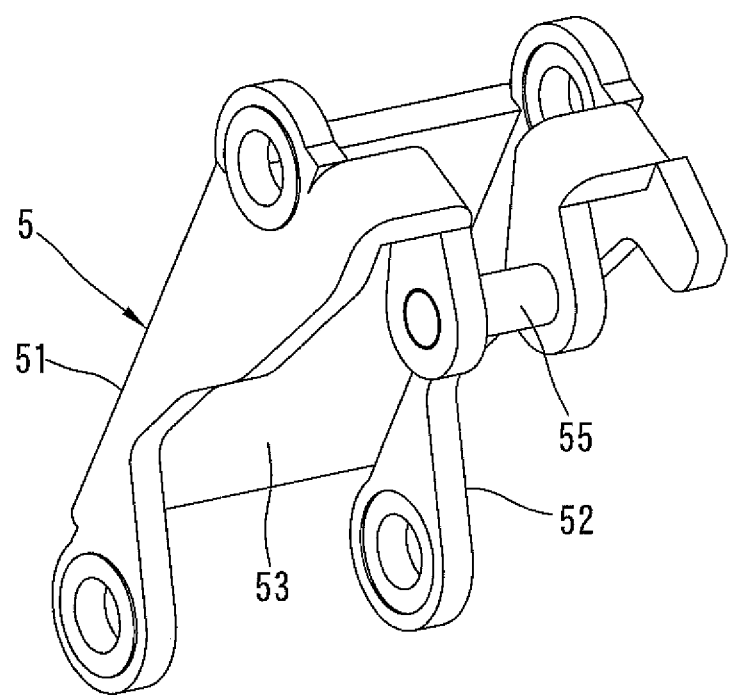
FIG. 38 is a perspective view of an outer link used in the third embodiment.

FIG. 34 shows a torsion spring 7A that may be used in place of the torsion coil spring 7 in the hinge device according to the present invention. The torsion spring 7A is made of a metal plate. The torsion spring 7A includes a cylindrical portion 74 made by winding the metal plate into a configuration having a generally C-shaped cross-section, a protruded portion (one end portion) 75 disposed in one end portion of the cylindrical portion 74 in an axial direction thereof and a protruded portion (the other end portion) 76 disposed in the other end portion of the cylindrical portion 74. It is to be understood that the protruded portion 75 is abutted against the side plate 41 of the inner link 4 and the protruded portion 76 is abutted against the side plate 52 of the outer link 5.

FIGS. 35 to 38 show a third embodiment of the present invention. In the third embodiment, other mechanisms than those used in the first and second embodiments are adopted as a catch mechanism (first rotation transmission mechanism), a second rotation transmission mechanism and a position adjustment mechanism. In the catch mechanism, a protrusion 41c protruded in the radial direction of the central shaft J1 is formed in a rear end portion of the side plate 41 of the inner link 4. Two protrusions 82i, 82i are disposed in the end surface of the rotor 82 opposed to the side plate 41. The protrusions 82i, 82i are disposed spaced from each other by a predetermined distance in the circumferential direction about the central shaft J1. The protrusion 41c is disposed between the two protrusions 82i, 82i such that the protrusion 41c is non-movable in the circumferential direction of the central shaft J1. By this arrangement, the inner link 4 and the rotor 82 are relatively non-rotatably connected to each other and the rotation of the inner link 4 can be transmitted to the rotor 82.

Now the second rotation transmission mechanism is described. An engagement shaft (shaft portion) 55 is disposed in a rear end portion of the outer link 5. The engagement shaft 55 is disposed parallel to the central shaft J2. Opposite end portions of the engagement shaft 55 are supported by the outer link 5. Two protrusions 81g, 81g are disposed in the outer circumferential surface of the damper body 81. The protrusions 81g, 81g are disposed spaced from each other by a predetermined distance in the circumferential direction of the damper body 81. A guide groove 81i is formed between the protrusions 81g, 81g. A middle portion of the engagement shaft 55 is disposed in the guide groove 81i such that the engagement shaft 55 is movable in the radial direction of the damper body 81 and generally non-movable in the circumferential direction of the damper body 81. Accordingly, when the outer link 5 is rotated, the engagement shaft 55 is abutted against one or the other of the two protrusions 81g, 81g depending on the rotational direction of the outer link 5. Thereby, the rotation of the outer link 5 is transmitted to the damper body 81.

The position adjustment mechanism is different from those in the previously described embodiments in the arrangements of the rotatable cam plate 95 and the movable cam plate 96. Specifically, the rotatable cam plate 95 is disposed outside of the side plate 42 of the inner link 4. In other words, the rotatable cam plate 95 is disposed between the side plate 42 and the side plate (fixed member) 32 of the hinge body 3. The rotatable cam plate 95 is prohibited from being moved in a direction away from the damper body 81 by the abutment against the side plate 32. The movable cam plate 96 is disposed between the side plate 42 and the bottom 81a of the damper body 81. Accordingly, the side plate 42 is disposed between the rotatable cam plate 95 and the movable cam plate 96. Portions of the rotatable cam plate 95 and the movable cam plate 96 are respectively protruded outward from the side plate 42 in the radial direction of the central shaft J1. Cam surfaces (not shown) respectively corresponding to the cam surfaces 95d, 96a are formed in the portions of the rotatable cam plate 95 and the movable cam plate 96 protruded from the side plate 42. It is to be understood that the cam surfaces are contacted with each other. Accordingly, when the rotatable cam plate 95 is operated to be rotated, the movable cam plate 96 is moved in the axial direction of the central shaft J1 and the damper body 81 is moved in the same direction.

The inner link 4, the outer link 5, the rotary damper 8, the rotatable cam plate 95 and the movable cam plate 96 of the hinge device having the position adjustment mechanism as described above can be built between the side plates 31, 32 of the hinge body 3 in the following manner. Firstly, the rotatable cam plate 95 is inserted between the side plates 31, 32 of the hinge body 3. Then, the rotatable cam plate 95 is moved in the axial direction of the central shaft J1. The rotatable cam plate 95 is contacted with the side plate 32 and the operation tab 95b is inserted into the operation window 32a. Next, the one end portions of the side plates 41, 42 of the inner link 4 are inserted between the side plate 31 and the rotatable cam plate 95. After that, the rotary damper 8 is inserted between the side plates 41, 42 and the protrusion 41c is inserted between the protrusions 82i, 82i. At this time, the protrusion 41c can be inserted between the protrusions 82i, 82i from outside in the radial direction of the central shaft J1 since a gap between the protrusions 82i, 82i is open toward outside in the radial direction of the central shaft J1. Accordingly, the rotary damper 8 can be inserted between the side plates 41, 42 simply by being moved in the radial direction of the central shaft J1. After that the movable cam plate 96 is inserted between the rotary damper 8 and the side plate 42. The movable cam plate 96 may be inserted between the side plates 41, 42 before the insertion of the rotary damper 8 between the side plates 41, 42 or may be inserted between the side plates 41, 42 at the same time with the rotary damper 8. Alternatively, the rotary damper 8 and the movable cam plate 96 may be inserted between the side plates 41, 42 before the insertion of the side plates 41, 42 between the side plates 31, 32 (rotatable cam plate 95). Then, the central shaft J1 is inserted through the side plates 31, 32, the side plates 41, 42, the rotary damper 8, the rotatable cam plate 95 and the movable cam plate 96, thereby the building-in being completed. After that, the outer link 5 is inserted between the side plates 31, 32, the engagement shaft 55 is inserted in the guide groove 81i between the protrusions 81g, 81g and the central shaft J2 is inserted through the side plates 31, 32 and the outer link 5. Alternatively, the outer link 5 may be inserted between the side plates 31, 32 before the insertion of the inner link 4 between the side plates 31, 32. In this case, the engagement shaft 55 is relatively inserted into the guide groove 81i between the protrusions 81g, 81g when the rotary damper 8 is inserted between the side plates 41, 42.

In this embodiment, one end portions of the two protrusions 91c, 91d of the cam member 91 are connected to each other, thereby the two protrusions 91c, 91d as a whole being formed in a generally U-shaped configuration. A distance between the protrusions 91c, 91d is slightly greater than a width of the protrusion 72 of the torsion coil spring 7, and the protrusion 72 is movable between the protrusions 91c, 91d through a slight distance in the circumferential direction of the coil portion 71. It is to be understood that alternatively the protrusion 72 may be inserted between the protrusions 91c, 91d such that the protrusion 72 is non-movable in the circumferential direction of the coil portion 71.

Moreover, in this embodiment, the movable cam plate 96 is prevented from rotation by a spacer 92 in place of the engagement shaft 34. For this function, an engagement recess 96b is formed in an outer circumferential surface of the movable cam plate 96. A bottom surface of the engagement recess 96b is a circular arcuate surface about the axis of the support shaft J3. An outer circumferential surface of the spacer 92 is a circular arcuate surface about the axis of the support shaft J3, having a radius of curvature that is equal to a radius of curvature of the circular arcuate surface that constitutes the engagement recess 96b. A portion of the outer circumferential surface of the spacer 92 is disposed in the engagement recess 96b. By this arrangement, the movable cam plate 96 is prevented from being rotated. Moreover, the spacer 92 is not prevented from being rotated by the movable cam plate 96.

Figure 39:
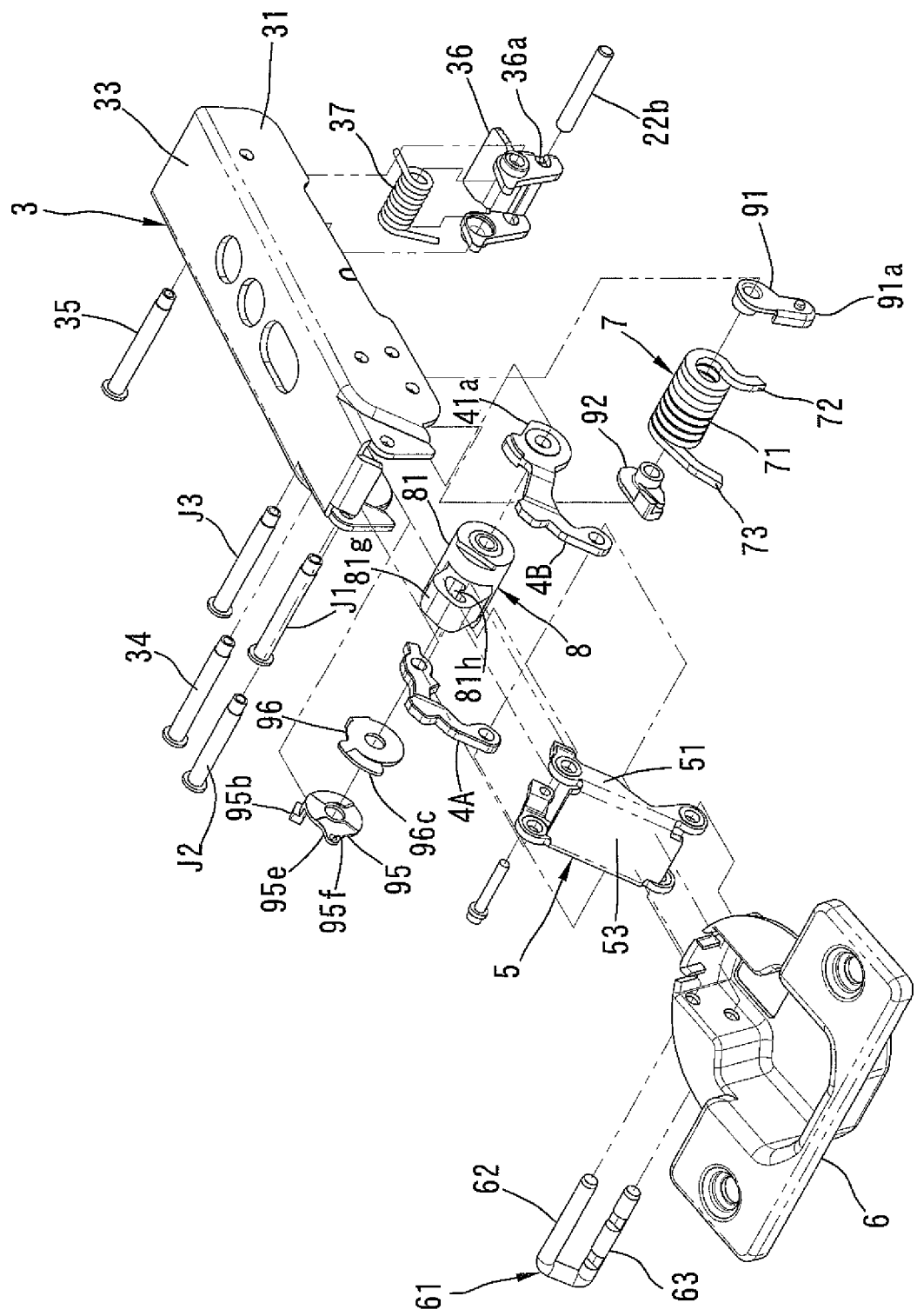
FIG. 39 is an exploded perspective view of a fourth embodiment of the present invention.
Figure 40:
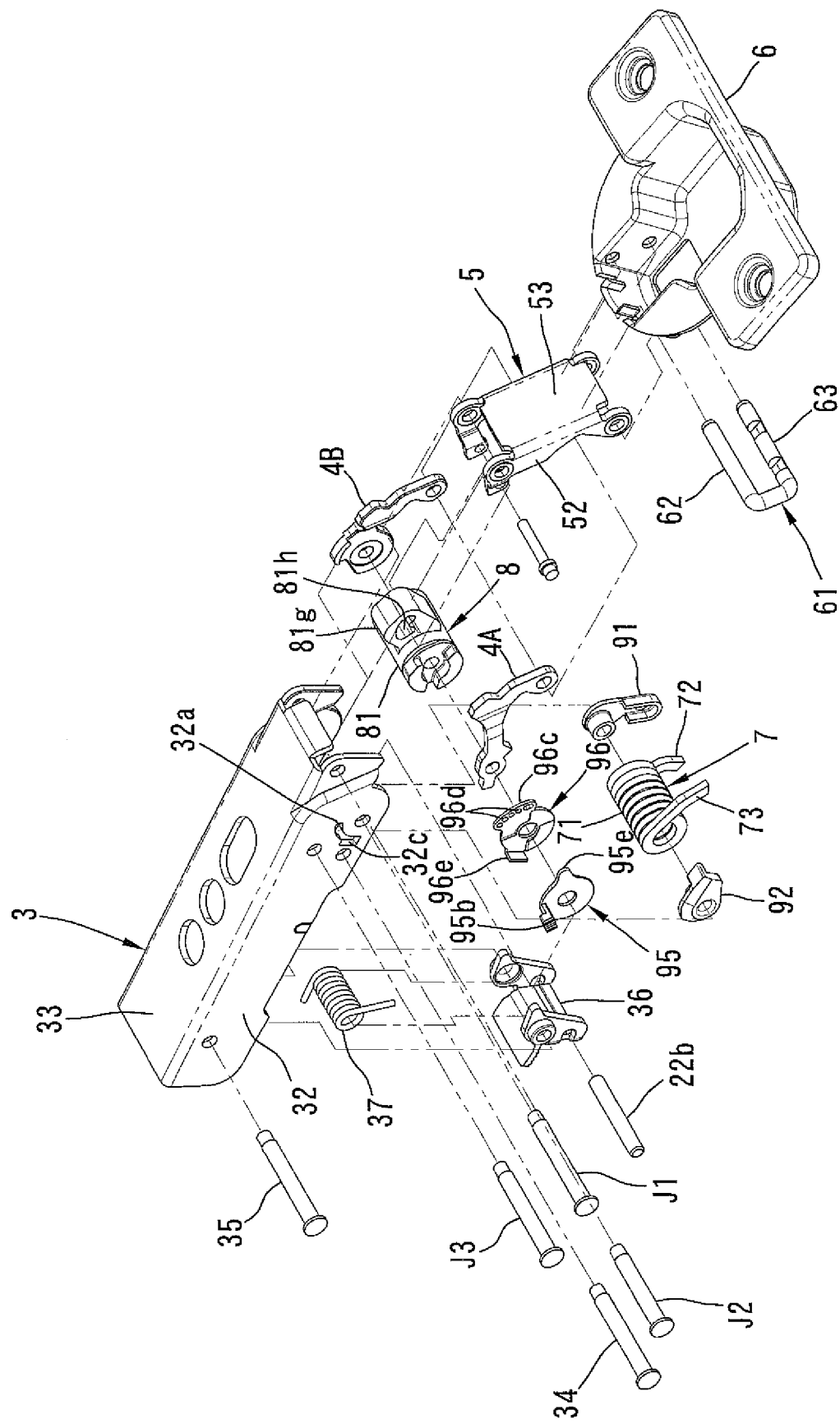
FIG. 40 is an exploded perspective view of the fourth embodiment, viewed from a different direction from FIG. 39.

FIGS. 39 and 40 show a fourth embodiment of the present invention. In the fourth embodiment, an upper inner link 4A and a lower inner link (first link) 4B are used in place of the inner link 4. The upper inner link 4A and the lower inner link 4B respectively have configurations corresponding to the side plates 42, 41 if separated from each other, with the connecting plate 43 of the inner link 4 being omitted. The upper inner link 4A and the lower inner link 4B are separated from each other and disposed spaced from each other in the vertical direction. Accordingly, the upper inner link 4A is disposed so as to be contacted with a surface of the side plate 32 of the hinge body 3 facing inside. The lower inner link 4B is disposed so as to be contacted with a surface of the side plate 31 facing inside.

The cam surface 41a is formed in one end portion of the lower inner link 4B (end portion on the central shaft J1 side). The cam surface 91a of the cam member 91 is pressed against the cam surface 41a by the torsion coil spring 7. Accordingly, the lower inner link 4B is rotationally biased by the torsion coil spring 7 to rotate the door-side mounting member 6. On the other hand, the upper inner link 4A is not rotationally biased by the torsion coil spring 7. The upper inner link 4A is just rotated following the rotation of the door-side mounting member 6.

As shown in FIG. 40, a catch recess 32c is formed in a portion of the inner circumferential surface of the operation window 32a on the large-diameter side. A catch arm 96e formed in the movable cam plate 96 is caught by the catch recess 32c. By this arrangement, the movable cam plate 96 is disposed in the side plate 31 of the hinge body 3 such that the movable cam plate 96 is non-rotatable but movable in the axial direction of the central shaft J1.

A protrusion 95e protruded in a radial direction of the rotatable cam plate 95 is formed in an outer circumferential surface of the rotatable cam plate 95. A catch protrusion 95f protruded toward the movable cam plate 96 is formed in a surface of the protrusion 95e facing toward the movable cam plate 96. An elongated protrusion 96c extending in a circumferential direction is formed in an outer circumferential surface of the movable cam plate 96. A plurality of engagement recesses 96d are formed in a surface of the elongated protrusion 96c facing toward the rotatable cam plate 95. The engagement recesses 96d are arranged such that when the rotatable cam plate 95 is rotated to a certain position, the catch protrusion 95f fits into one of the engagement recesses 96d. By this arrangement, a rotational position of the rotatable cam plate 95 is determined, thereby a position of the movable cam plate 96 in an axial direction of the rotary damper 8 being determined. In this embodiment, a position of the damper body 81 is fixed to the hinge body 3, and when the position of the movable cam plate 96 is adjusted, a position of the rotor 82 with respect to the damper body 81 is adjusted in the axial direction of the damper body 81, thereby a damping force of the rotary damper 8 being adjusted.

The guide hole 81h is formed in the protrusion 81g in this embodiment as well. However, in this embodiment, the guide hole 81h does not linearly extend in the radial direction of the damper body 81 but has a bent configuration. By this arrangement, the damping force of the rotary damper 8 is changed curvilinearly according to the rotational position of the door-side mounting member 6.

It is to be understood that the present invention is not limited to the embodiments described above, and various modifications may be adopted without departing from the spirit or scope of the invention.

For example, while the cupped member 6 is rotatably connected to the hinge body 3 by the inner link 4 and the outer link 5 in the embodiments described above, another link may be used between the cupped member 6 and the hinge body 3 as in the known hinge devices.

Moreover, while the inner link 4 is used as the first link and the outer link 5 is used as the second link in the embodiments described above, the inner link 4 may be used as the second link and the outer link 5 may be used as the first link. In such a case, the rotary damper 8 may be disposed in the outer link 5, the rotor 82 may be non-rotatably connected to the outer link 5 and the damper body 81 may be connected to the inner link 4 such that the damper body 81 may be rotated accompanying the rotation of the inner link 4, for example. Moreover, the protrusion 73 may be contacted with the outer link 5 via the cam member 91.

Furthermore, in the embodiments described above, the rotary damper 8 in which the annular space 83 is formed between the inner circumferential surface of the receiving portion 81A of the damper body 81 and the outer circumferential surface of the rotor 82 is adopted as a rotary damper. Alternatively, as disclosed in Japanese Unexamined Patent Application Publication No. 2006-242253 and Japanese Unexamined Patent Application Publication (Translation of PCT International Application Publication) No. 2010-528938, a rotary damper in which a space having a fan-like configuration or a generally half-circular configuration is formed between an inner circumferential surface of a receiving portion of a damper body and an outer circumferential surface of a rotor may be used as a rotary damper, for example.

REFERENCE SIGNS LIST

S1 gap
S2 gap
3 hinge body (housing-side mounting member)
4 inner link (first link)
5 outer link (second link)
6 cupped member (door-side mounting member)
8 rotary damper
31 side plate (second side plate)
32 side plate (first side plate; fixed member)
32a operation window
42 side plate (fixed member)
81 damper body
81A receiving portion
82 rotor
83A high pressure chamber (pressure chamber)
83B low pressure chamber (pressure chamber)
95 rotatable cam plate (cam member)
95b operation tab
95d cam surface (cam portion)
96 movable cam plate (second cam member)
96a cam surface (abutment portion)

The invention claimed is:

1. A rotary damper comprising:
a damper body having a receiving portion; and
a rotor rotatably disposed in the receiving portion of the damper body,
wherein a space between an inner circumferential surface of the receiving portion and an outer circumferential surface of the rotor is divided into a plurality of pressure chambers,
wherein the receiving portion and the rotor are opposed each other in a direction of a rotation axis of the rotor, the receiving portion and rotor having a gap formed between opposing surfaces of the receiving portion and rotor, the plurality of pressure chambers being communicated with each other by the gap,
wherein in case where the rotor is rotated in one direction, pressure difference is generated in the plurality of pressure chambers so that fluid filled in the pressure chamber at high pressure flows into the pressure chamber at low pressure via the gap,
wherein the damper body and the rotor are relatively movable in the direction of the rotation axis of the rotor,
wherein the rotary damper further comprises a position adjustment mechanism that causes one of the damper body and the rotor to be moved in the direction of the rotation axis of the rotor, thereby adjusting a position of the one of the damper body and the rotor with respect to the other of the damper body and the rotor, and
wherein size of the gap is adjusted by the position adjustment mechanism moving the one of the damper body and the rotor in the direction of the rotation axis of the rotor so that a rotation speed of the rotor is controlled.

2. The rotary damper according to claim 1,
wherein the rotary damper further comprises fixed members,
wherein positions of the fixed members are fixed in the direction of the rotation axis of the rotor,
wherein the position adjustment mechanism is disposed between the fixed members and the one of the damper body and the rotor, and
wherein the position adjustment mechanism causes one of the damper body and the rotor to be moved with respect to the fixed members in the direction of the rotation axis of the rotor, thereby adjusting the position of the one of the damper body and the rotor with respect to the other of the damper body and the rotor in the direction of the rotation axis of the rotor.

3. A rotary damper comprising:
a damper body having a receiving portion; and
a rotor rotatably disposed in the receiving portion of the damper body,
wherein a space between an inner circumferential surface of the receiving portion and an outer circumferential surface of the rotor is divided into a plurality of pressure chambers,
wherein a rotation speed of the rotor is controlled to be at a low speed by a flow resistance of fluid filled in each of the pressure chambers when the fluid flows through gaps between an inner surface of the receiving portion and an outer surface of the rotor opposed to each other in a direction of a rotation axis of the rotor,
wherein the damper body and the rotor are relatively movable in the direction of the rotation axis of the rotor,
wherein the rotary damper further comprises a position adjustment mechanism that causes one of the damper body and the rotor to be moved in the direction of the rotation axis of the rotor, thereby adjusting a position of the one of the damper body and the rotor with respect to the other of the damper body and the rotor,
wherein the rotary damper further comprises fixed members,
wherein positions of the fixed members are fixed in the direction of the rotation axis of the rotor,
wherein the position adjustment mechanism is disposed between the fixed members and the one of the damper body and the rotor,
wherein the position adjustment mechanism causes one of the damper body and the rotor to be moved with respect to the fixed members in the direction of the rotation axis of the rotor, thereby adjusting the position of the one of the damper body and the rotor with respect to the other of the damper body and the rotor in the direction of the rotation axis of the rotor,
wherein the fixed members are disposed opposed to the one of the damper body and the rotor in the direction of the rotation axis of the rotor,
wherein the position adjustment mechanism comprises a cam mechanism disposed between the one of the damper body and the rotor and the fixed members,
wherein the cam mechanism comprises a cam member formed separately from the damper body and the rotor,
wherein the cam member is disposed such that the cam member is rotatable about the rotation axis of the rotor in a condition where the cam member is contacted with surfaces of the fixed members opposed to the one of the damper body and the rotor, and
wherein a cam portion is disposed in a surface of the cam member opposed to the one of the damper body and the rotor, the cam portion being able to be abutted against the one of the damper body and the rotor, thereby causing the one of the damper body and the rotor to be moved in the direction of the rotation axis of the rotor according to a rotation of the cam member.

4. The rotary damper according to claim 3,
wherein the cam mechanism further comprises a second cam member formed separately from the damper body, the rotor and the fixed members,
wherein the second cam member is disposed such that the second cam member is non-rotatable about the rotation axis of the rotor in a condition where the second cam member is contacted with a surface of the one of the damper body and the rotor opposed to the cam member,
wherein an abutment portion is disposed in a surface of the second cam member opposed to the cam member, the abutment portion being abutted against the cam portion, and
wherein the cam member causes the second cam member to be moved in the direction of the rotation axis of the rotor according to a rotation of the second cam member, thereby causing the one of the damper body and the rotor to be moved in the direction of the rotation axis of the rotor.

5. A hinge device with damper comprising:
a housing-side mounting member;
a first link having one end portion thereof rotatably connected to the housing-side mounting member;
a second link having one end portion thereof rotatably connected to the housing-side mounting member;
a door-side mounting member, the other end portion of the first link and the other end portion of the second link rotatably connected to the door-side mounting member; and
a rotary damper that controls a rotation speed of the first link with respect to the housing-side mounting member to be at a low speed,
wherein the rotary damper comprises a damper body and a rotor,
wherein the damper body comprises a receiving portion,
wherein the rotor is disposed in the receiving portion of the damper body such that the rotor is rotatable about a rotation axis of the rotor,
wherein a space between an inner circumferential surface of the receiving portion and an outer circumferential surface of the rotor is divided into a plurality of pressure chambers,
wherein the receiving portion and the rotor are opposed each other in a direction of the rotation axis of the rotor, the receiving portion and rotor having a gap formed between opposing surfaces of the receiving portion and rotor, the plurality of pressure chambers being communicated with each other by the gap,
wherein in case where the rotor is rotated in one direction, pressure difference is generated in the plurality of pressure chambers so that fluid filled in the pressure chamber at high pressure flows into the pressure chamber at low pressure via the gap,
wherein the damper body and the rotor are relatively movable in the direction of the rotation axis of the rotor,
wherein the hinge device with damper further comprises a position adjustment mechanism that causes one of the damper body and the rotor to be moved in the direction of the rotation axis of the rotor, thereby adjusting a position of the one of the damper body and the rotor with respect to the other of the damper body and the rotor, and
wherein size of the gap is adjusted by the position adjustment mechanism moving the one of the damper body and the rotor in the direction of the rotation axis of the rotor so that a rotation speed of the rotor is controlled.

6. The hinge device with damper according to claim 5,
wherein the rotary damper is disposed with a rotation axis of the rotor coinciding with a center of rotation of the one end portion of the first link with respect to the housing-side mounting member,
wherein the position adjustment mechanism is disposed between one of the housing-side mounting member and the first link and the one of the damper body and the rotor, and
wherein the position adjustment mechanism causes the one of the damper body and the rotor to be moved with respect to the one of the housing-side mounting member and the first link in the direction of the rotation axis of the rotor, thereby causing the one of the damper body and the rotor to be moved with respect to the other of the damper body and the rotor in the direction of the rotation axis of the rotor.

7. The hinge device with damper according to claim 6,
wherein the position adjustment mechanism comprises a cam mechanism disposed between the one of the housing-side mounting member and the first link and the one of the damper body and the rotor,
wherein the cam mechanism comprises a cam member formed separately from the damper body and the rotor,
wherein the cam member is disposed such that the cam member is rotatable about the rotation axis of the rotor in a condition where the cam member is contacted with a surface of the one of the housing-side mounting member and the first link opposed to the one of the damper body and the rotor,
wherein a cam portion is disposed in a surface of the cam member opposed to the one of the damper body and the rotor,
wherein the cam portion is abutted against the one of the damper body and the rotor, thereby causing the one of the damper body and the rotor to be moved in the direction of the rotation axis of the rotor according to a rotation of the cam member.

8. The hinge device with damper according to claim 7,
wherein a first side plate and a second side plate intersecting with the rotation axis of the rotor are formed in opposite side portions of the housing-side mounting member in the direction of the rotation axis of the rotor, thereby the housing-side mounting member having a U-shaped cross-sectional configuration,
wherein the one end portion of the first link, the one end portion of the second link, the rotary damper and the cam member are received in the housing-side mounting member,
wherein an operation window is formed through the first side plate of the housing-side mounting member in the direction of the rotation axis of the rotor, the operation window having a configuration of an elongated hole extending along a circular arc about the rotation axis of the rotor,
wherein the cam member is provided with an operation tab, and
wherein the operation tab is disposed in the operation window such that a position of the operation tab can be adjusted in a longitudinal direction of the operation window so that the operation tab can be manipulated from outside the housing-side mounting member to cause the cam member to be rotated.

9. The hinge device with damper according to claim 8,
wherein the cam mechanism further comprises a second cam member formed separately from the first link, the damper body and the rotor, wherein the second cam member is disposed such that the second cam member is non-rotatable about the rotation axis of the rotor in a condition where the second cam member is contacted with a surface of the one of the damper body and the rotor opposed to the cam member, wherein an abutment portion is disposed in a surface of the second cam member opposed to the cam member, wherein the abutment portion is abutted against the cam portion, and wherein the cam member causes the second cam member to be moved in the direction of the rotation axis of the rotor according to a rotation of the cam member, thereby causing the one of the damper body and the rotor to be moved in the direction of the rotation axis of the rotor.

10. The hinge device with damper according to claim 7, wherein the cam mechanism further comprises a second cam member formed separately from the first link, the damper body and the rotor, wherein the second cam member is disposed such that the second cam member is non-rotatable about the rotation axis of the rotor in a condition where the second cam member is contacted with a surface of the one of the damper body and the rotor opposed to the cam member, wherein an abutment portion is disposed in a surface of the second cam member opposed to the cam member, the abutment portion being abutted against the cam portion, and wherein the cam member causes the second cam member to be moved in the direction of the rotation axis of the rotor according to a rotation of the cam member, thereby causing the one of the damper body and the rotor to be moved in the direction of the rotation axis of the rotor.

\* \* \* \* \*